United States Patent
Johnson et al.

(10) Patent No.: US 11,690,312 B2
(45) Date of Patent: Jul. 4, 2023

(54) METHODS, SYSTEMS AND COMPUTER-READABLE MEDIUMS FOR POSITION CONTROL OF A MACHINE

(71) Applicant: Deere & Company, Moline, IL (US)

(72) Inventors: Scott C. Johnson, Fargo, ND (US); Douglas J. Olson, Valley City, ND (US)

(73) Assignee: Deere & Company, Moline, IL (US)

( * ) Notice: Subject to any disclaimer, the term of this patent is extended or adjusted under 35 U.S.C. 154(b) by 473 days.

(21) Appl. No.: 16/898,902

(22) Filed: Jun. 11, 2020

(65) Prior Publication Data

US 2021/0112703 A1  Apr. 22, 2021

Related U.S. Application Data

(60) Provisional application No. 62/923,057, filed on Oct. 18, 2019.

(51) Int. Cl.
*A01C 19/02* (2006.01)
*A01C 7/16* (2006.01)
(Continued)

(52) U.S. Cl.
CPC .............. *A01C 19/02* (2013.01); *A01C 7/16* (2013.01); *A01C 7/18* (2013.01); *A01C 7/201* (2013.01);
(Continued)

(58) Field of Classification Search
CPC .. A01C 19/02; A01C 7/16; A01C 7/18; A01C 7/201; A01C 19/00; A01C 7/08; A01C 7/00; A01C 7/20; G06F 9/3836; G06F 9/38; G06F 9/30; G06F 9/06; G06F 9/00; G06F 17/13; G06F 17/16; G06F 17/11; G06F 17/10; G06F 17/00; H04L 12/40; H04L 2012/40215; H04L 12/28; H04L 12/00; H04L 2012/40208
See application file for complete search history.

(56) References Cited

U.S. PATENT DOCUMENTS 7,661,377 B2  2/2010  Keaton et al.
8,744,794 B2  6/2014  Wu et al.
(Continued)

FOREIGN PATENT DOCUMENTS

EP  3259972 A1  12/2017
EP  3437450 A1  2/2019
(Continued)

OTHER PUBLICATIONS

European Search Report issued in counterpart application No. 20199977.8 dated Mar. 16, 2021 (11 pages).
(Continued)

*Primary Examiner* — Christopher J. Novosad
(74) *Attorney, Agent, or Firm* — Harness, Dickey & Pierce, P.L.C.

(57) ABSTRACT

A system includes a motor, a memory storing instructions and at least one controller configured to execute the instructions to cause the system to obtain at least one message over a network, the at least one message indicating a target position for a rotor of the motor and a target time associated with the target position, determine a position command and a speed command based on the target position and the target time, and control the motor based on the position command and the speed command.

23 Claims, 25 Drawing Sheets

(51) Int. Cl.
*A01C 7/18* (2006.01)
*A01C 7/20* (2006.01)
*G06F 9/38* (2018.01)
*H04L 12/40* (2006.01)
*G06F 17/13* (2006.01)
*G06F 17/16* (2006.01)

(52) U.S. Cl.
CPC ............ *G06F 9/3836* (2013.01); *H04L 12/40* (2013.01); *G06F 17/13* (2013.01); *G06F 17/16* (2013.01); *H04L 2012/40215* (2013.01)

(56) References Cited

U.S. PATENT DOCUMENTS

| | | |
|---|---|---|
| 8,985,037 B2 | 3/2015 | Radtke et al. |
| 10,206,326 B2 | 2/2019 | Garner et al. |
| 2016/0128269 A1 | 5/2016 | Helmick et al. |
| 2019/0246551 A1 | 8/2019 | Campbell et al. |

FOREIGN PATENT DOCUMENTS

| | | |
|---|---|---|
| WO | WO2008155235 A1 | 12/2008 |
| WO | WO2012003134 A2 | 1/2012 |

OTHER PUBLICATIONS

"Specification of Time Synchronization over CAN" AUTOSAR CP, Realease 4.3.1, dated Dec. 8, 2017, pp. 1-70.

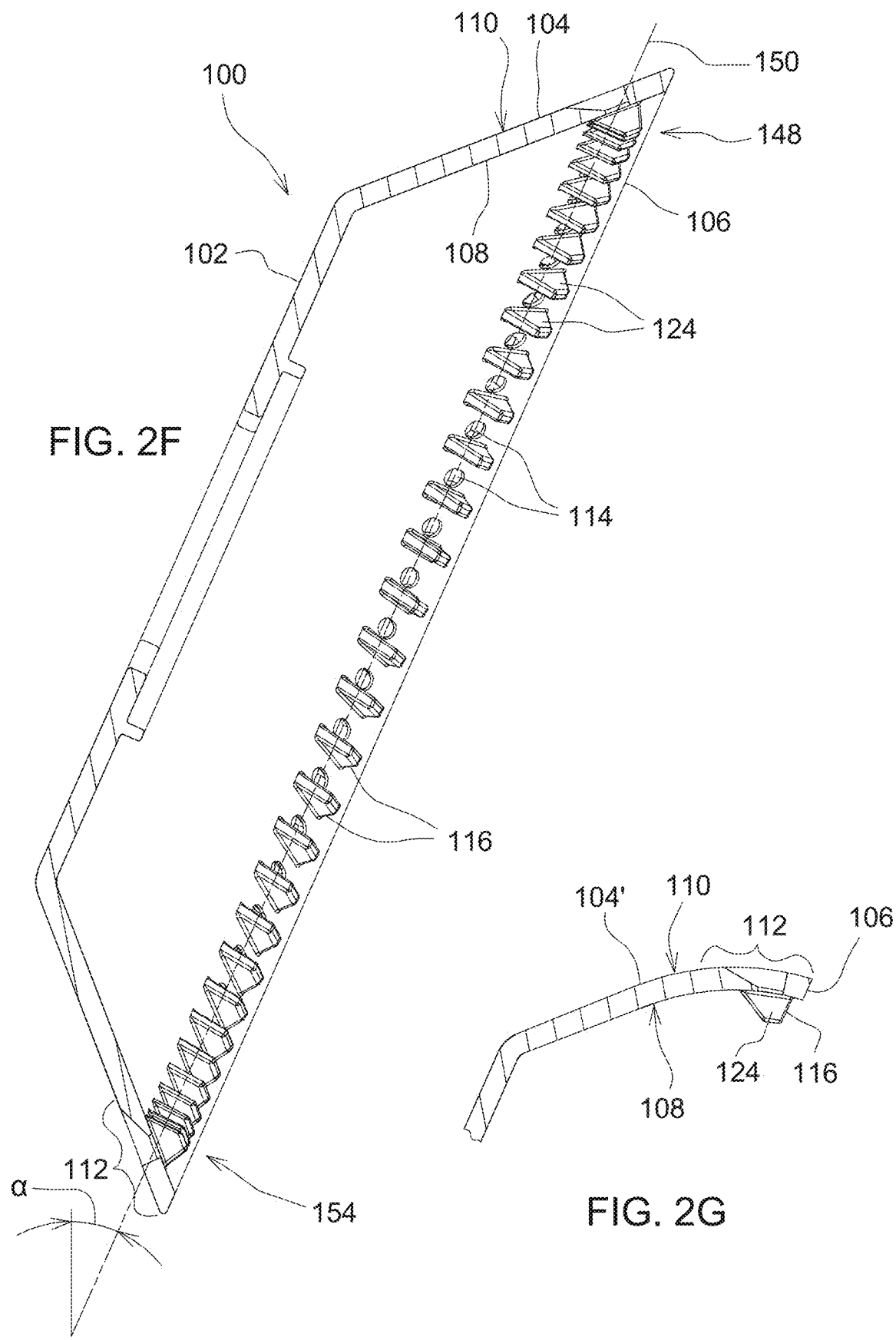

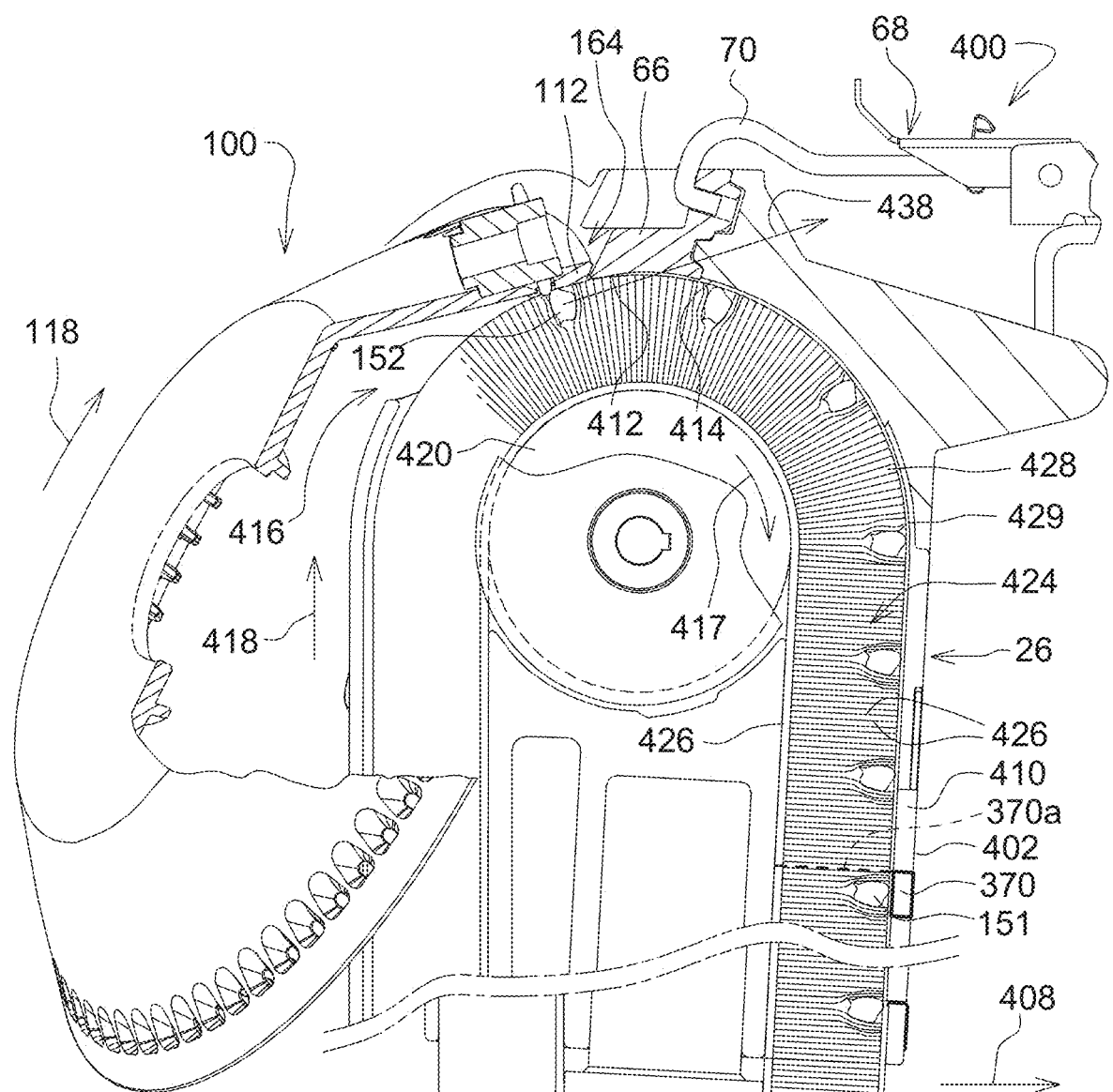
FIG. 2I
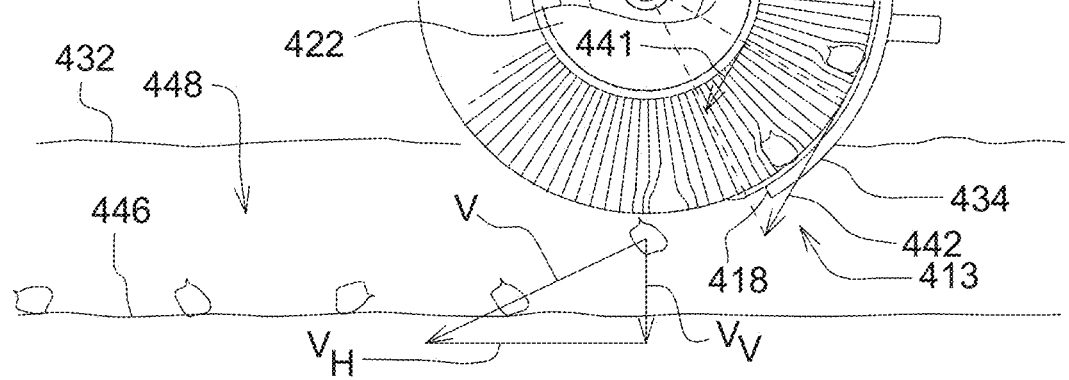

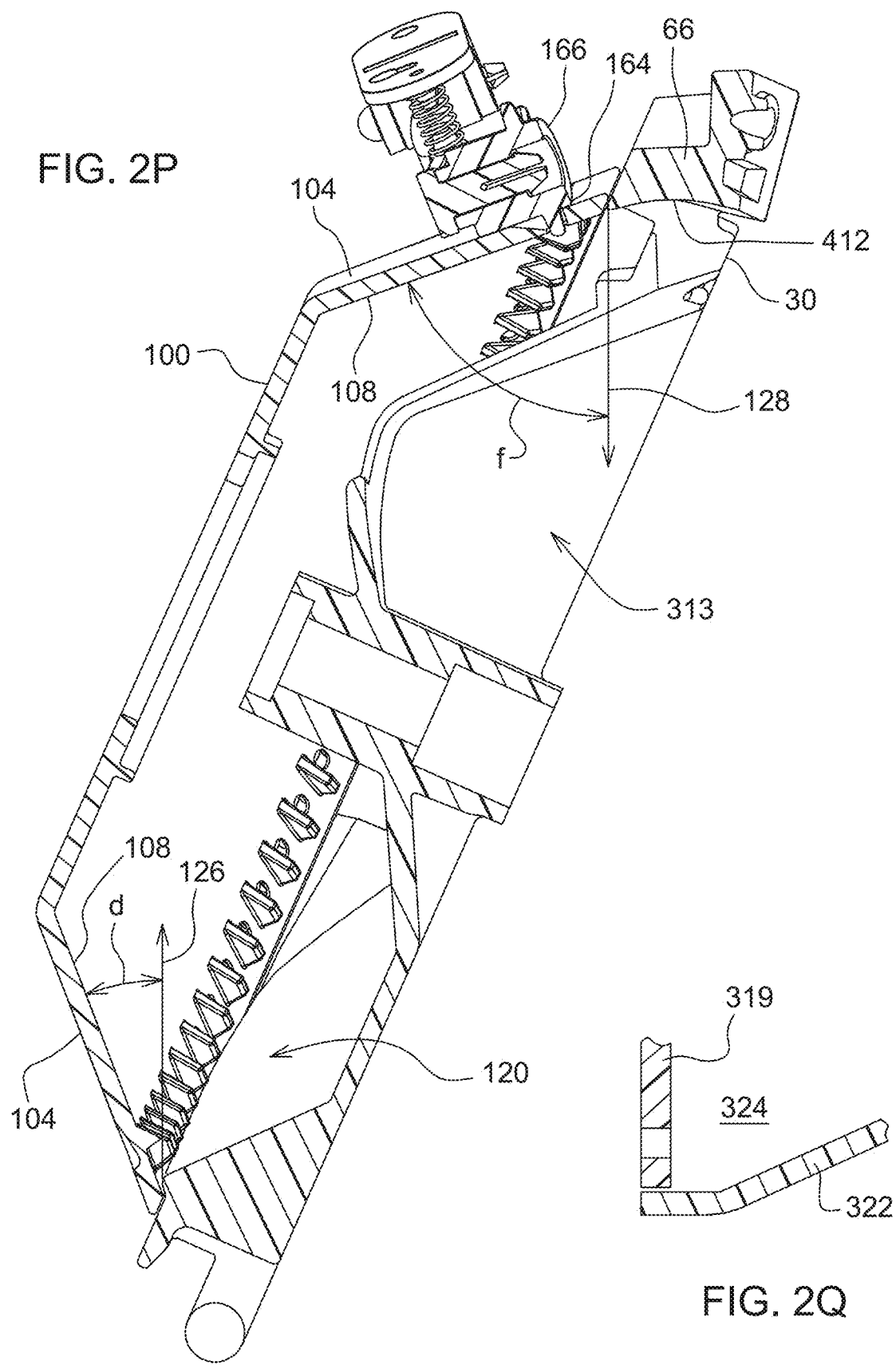

| SOF | CAN ID | RTR | Control Field | | | | | | | | | CRC | ACK | End of Frame |
|---|---|---|---|---|---|---|---|---|---|---|---|---|---|---|
| | | | Byte | 1 | 2 | 3 | 4 | 5 | 6 | 7 | 8 | | | |
| | | | Bit | 0-7 | 0-7 | 0-7 | 0-7 | 0-7 | 0-7 | 0-7 | 0-7 | | | |
| | | | Rate | Target Time | | | | Target Position | | | | | | |

FIG. 8B

| SOF | 11 Bit CAN ID | SRR | IDE | 18 Bit CAN ID | RTR | Control Field | Data | | CRC | ACK | End of Frame |
|---|---|---|---|---|---|---|---|---|---|---|---|
| | | | | | | | Target Time | Target Position | | | |

FIG. 8C

METHODS, SYSTEMS AND COMPUTER-READABLE MEDIUMS FOR POSITION CONTROL OF A MACHINE

CROSS-REFERENCE TO RELATED APPLICATIONS

This application claims priority under 35 U.S.C. § 119(e) to U.S. Provisional Patent Application No. 62/923,057 filed in the United States Patent and Trademark Office on Oct. 18, 2019, the entire contents of which are herein incorporated by reference.

FIELD

Example embodiments are related to systems and methods for controlling a position of a machine.

BACKGROUND

Vehicles (e.g., automobiles, tractors and excavators) often include electrical applications (e.g., electric drives).

SUMMARY

At least one example embodiment provides a system including a motor, a memory storing instructions and at least one controller configured to execute the instructions to cause the system to obtain at least one message over a network, the message indicating a target position for a rotor of the motor and a target time associated with the target position, determine a position command and a speed command based on the target position and the target time, and control the motor based on the position command and the speed command.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 1 is a side elevation view of a row unit of an agricultural row crop planter;

FIG. 3 illustrates a control system of a seed conveyor according to at least one example embodiment;

FIG. 4 illustrates an electronic data processing system according to at least one example embodiment;

FIG. 5 illustrates an electronic data processing system according to at least one example embodiment;

FIG. 8B illustrates a controller area network (CAN) message according to at least one example embodiment; and FIG. 8C illustrates a controller area network (CAN) message according to at least one example embodiment.

DETAILED DESCRIPTION

Figure 1:
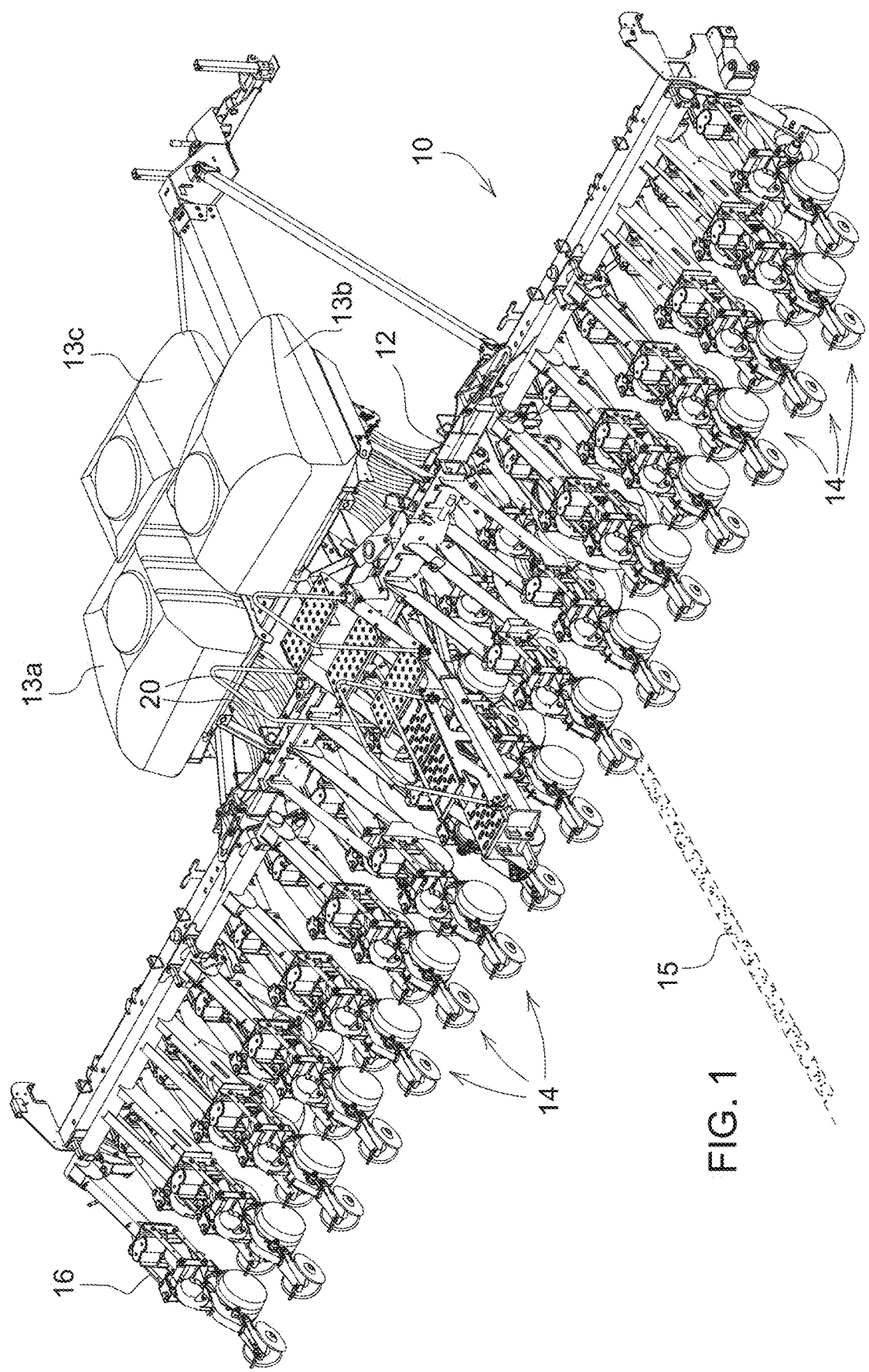

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), Digital Signal Processors (DSPs), Application-Specific-Integrated-Circuits (ASICs), Field Programmable Gate Arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

Shared memory hardware encompasses a single memory device that stores some or all code from multiple modules. Group memory hardware encompasses a memory device that, in combination with other memory devices, stores some or all code from one or more modules.

The terms memory and is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways. The term data storage device may be used interchangeably with memory device.

In the description below, the q-d axis current or voltage refers to the direct axis current or voltage and the quadrature axis current or voltage as applicable in the context of vector-controlled alternating current machines. Moreover, while the term command is used below, it should be understood that command refers to a target value.

Vehicles (e.g., automobiles, tractors and excavators) often include electrical applications (e.g., electric drives). These electric drives may be used in applications such as a planter row unit for seeding. More specifically, the present disclosure relates to a row unit having a seed meter and a seed delivery mechanism.

FIG. 1 illustrates a seeding machine 10, such as a row crop planter. The seeding machine 10 has a frame 12 on which are mounted a plurality of individual row units 14. Seed sources, such as storage tanks 13a-13c, hold seed that is delivered, e.g., pneumatically, to a mini-hopper (not shown) on each row unit 14. The storage tanks 13a-13c may be coupled to the mini-hoppers by way of conduits 20, such as hoses, and a pressurized delivery apparatus (not shown).

Each storage tank 13a-13c can be used to contain the same variety of seeds, or a different variety of seeds. For example, a first storage tank 13a may contain a first variety of seeds, a second storage tank 13b may contain a second variety of seeds, and a third storage tank 13c may contain a third variety of seeds. The varieties are typically within the same crop (such as corn, soy, etc.), with each variety having different traits which allows a more optimal variety to be planted at a given location in a field. The traits may include tolerances of seed to disease, draught, moisture, pests, and other seed characteristics, etc. It may also be possible for the different varieties to include plant type, such as corn, soy, etc. For example, the first storage tank 13a may contain corn, the second storage tank 13b may contain soy, and the third storage tank 13c may contain a more moisture tolerant variety of corn or soy. Thus, each row unit 14 can be coupled to several conduits 20 such that each row unit 14 is coupled to each storage tank 13a-13c to receive the first, second, and third varieties of seed. In other constructions, the storage tanks 13a-13c may contain the same variety of seed.

Each row unit 14 has a frame member 18 to which the components of the row unit 14 are mounted. For example, the frame member 18 may carry furrow opening disks for forming an open furrow 15 in the soil beneath the seeding machine 10 into which seed is deposited, and closing and packing wheels to close the furrow 15 over the deposited seed and to firm the soil in the closed furrow 15. A seed meter 24 and a seed delivery system 400 are also attached to the frame member 18 of the planting unit.

Figure 2A:
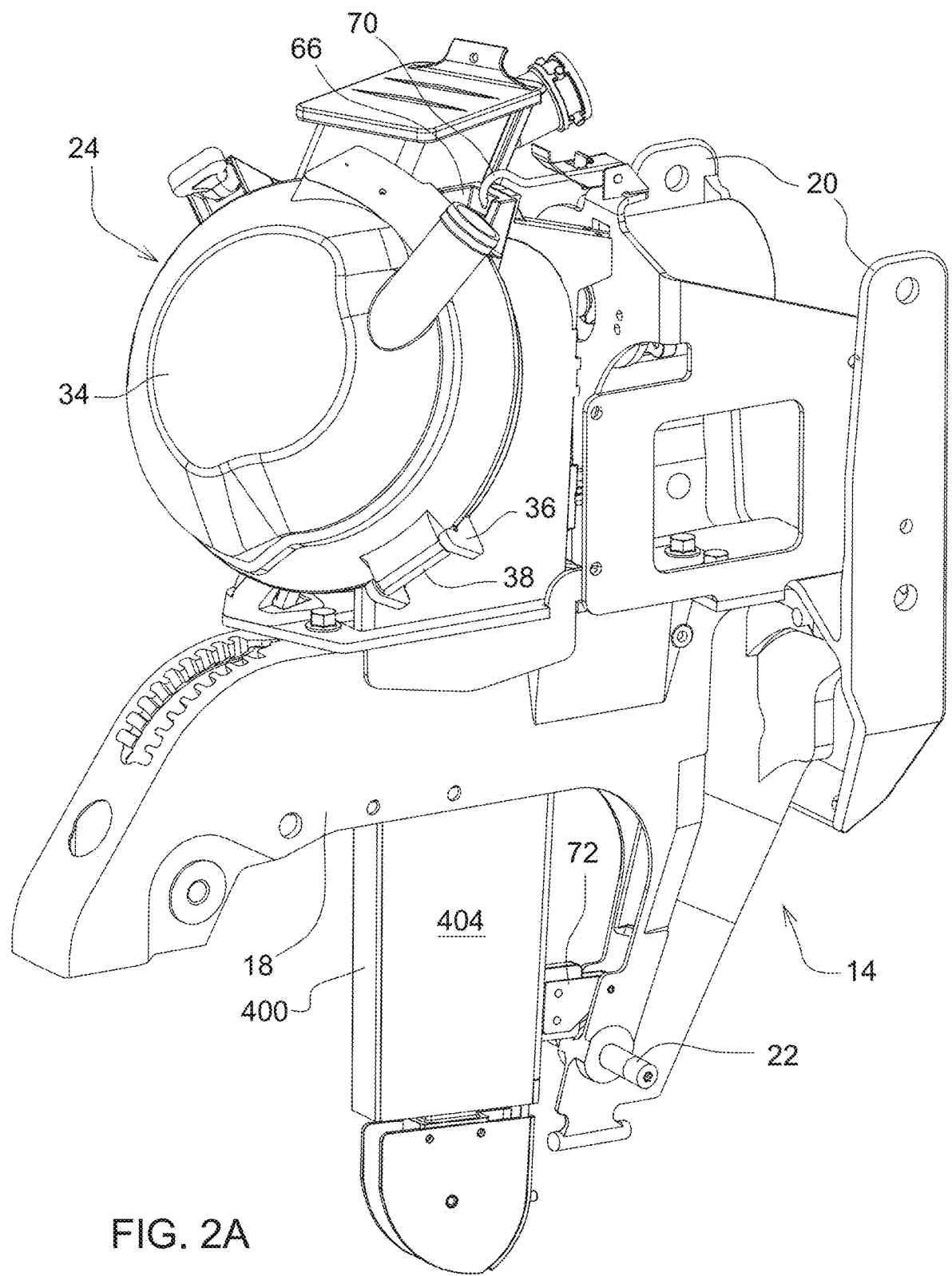
FIGS. 2A-2T illustrate various views of a seed metering and delivery system in the agricultural row crop planter of FIG. 1, according to at least one example embodiment.
Figure 2B:
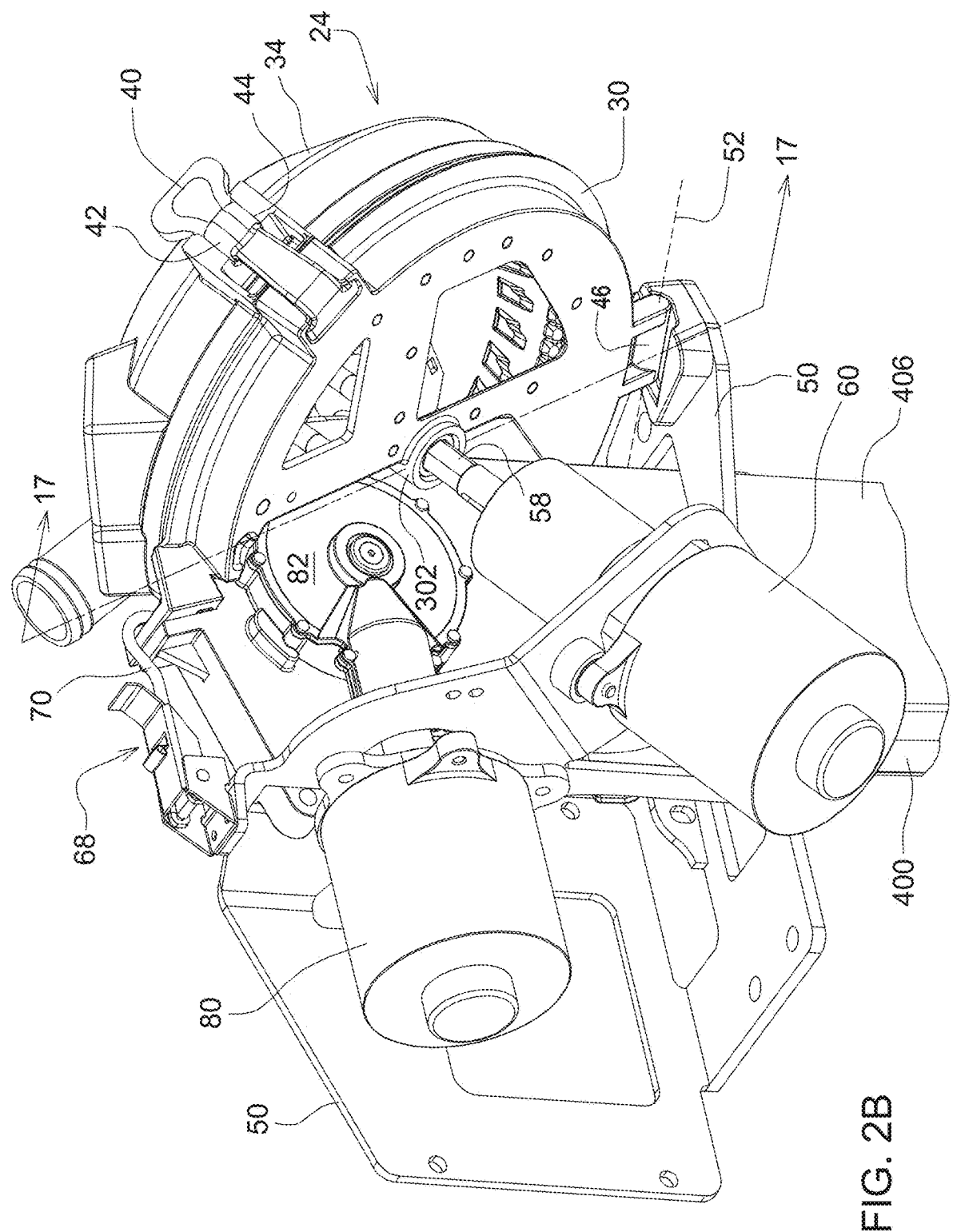
Figure 2C:
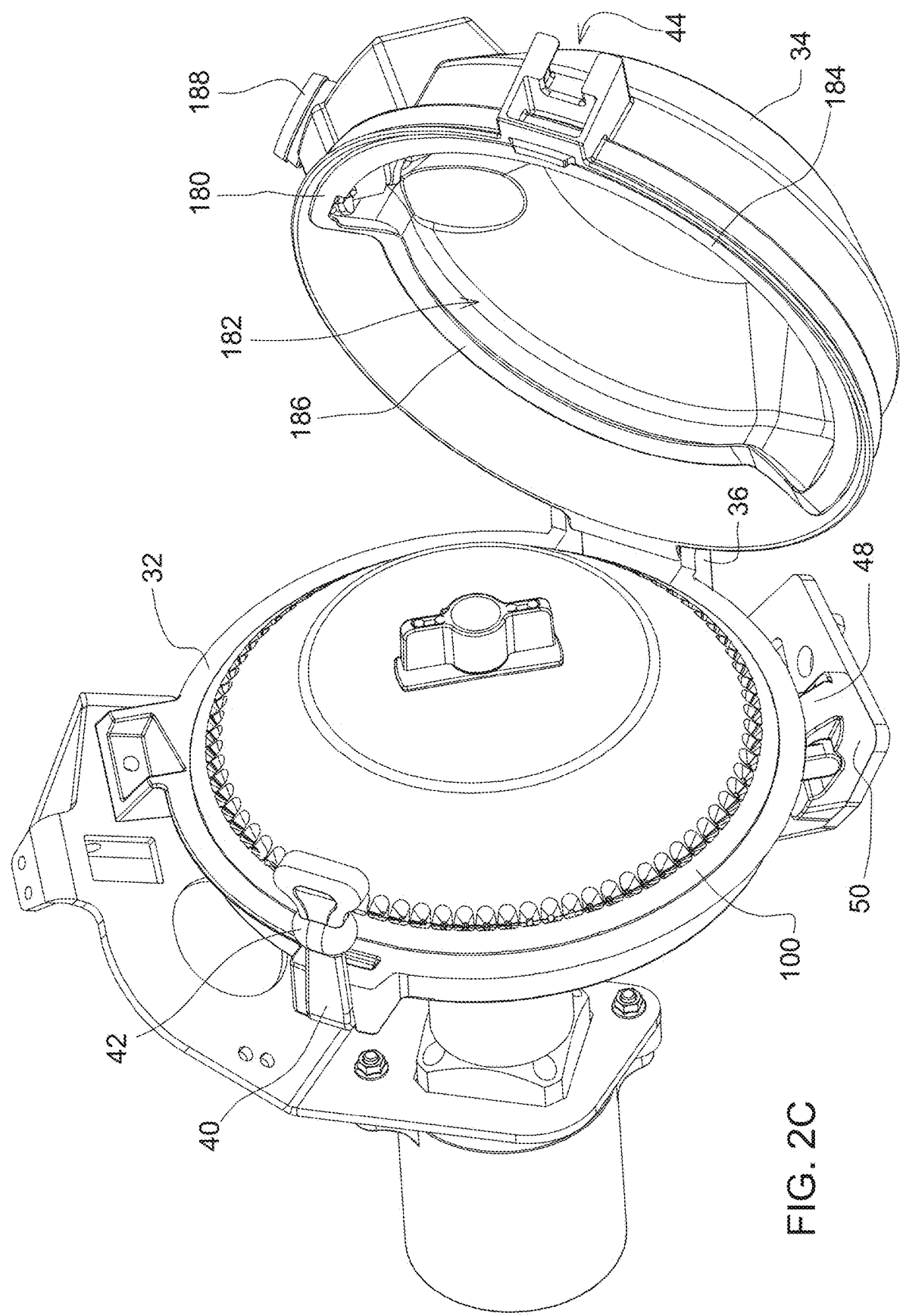
Figure 2D:
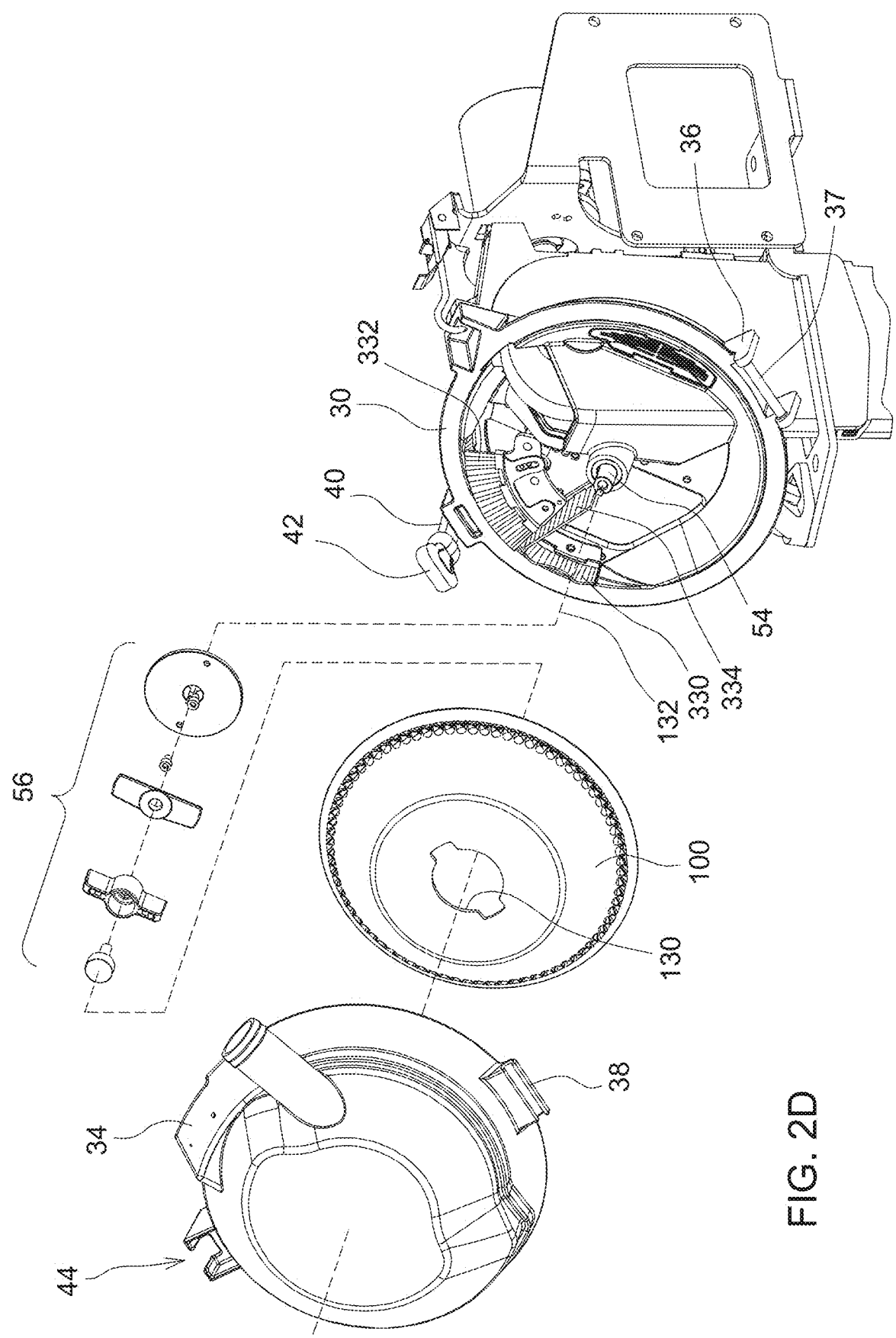
Figure 2E:
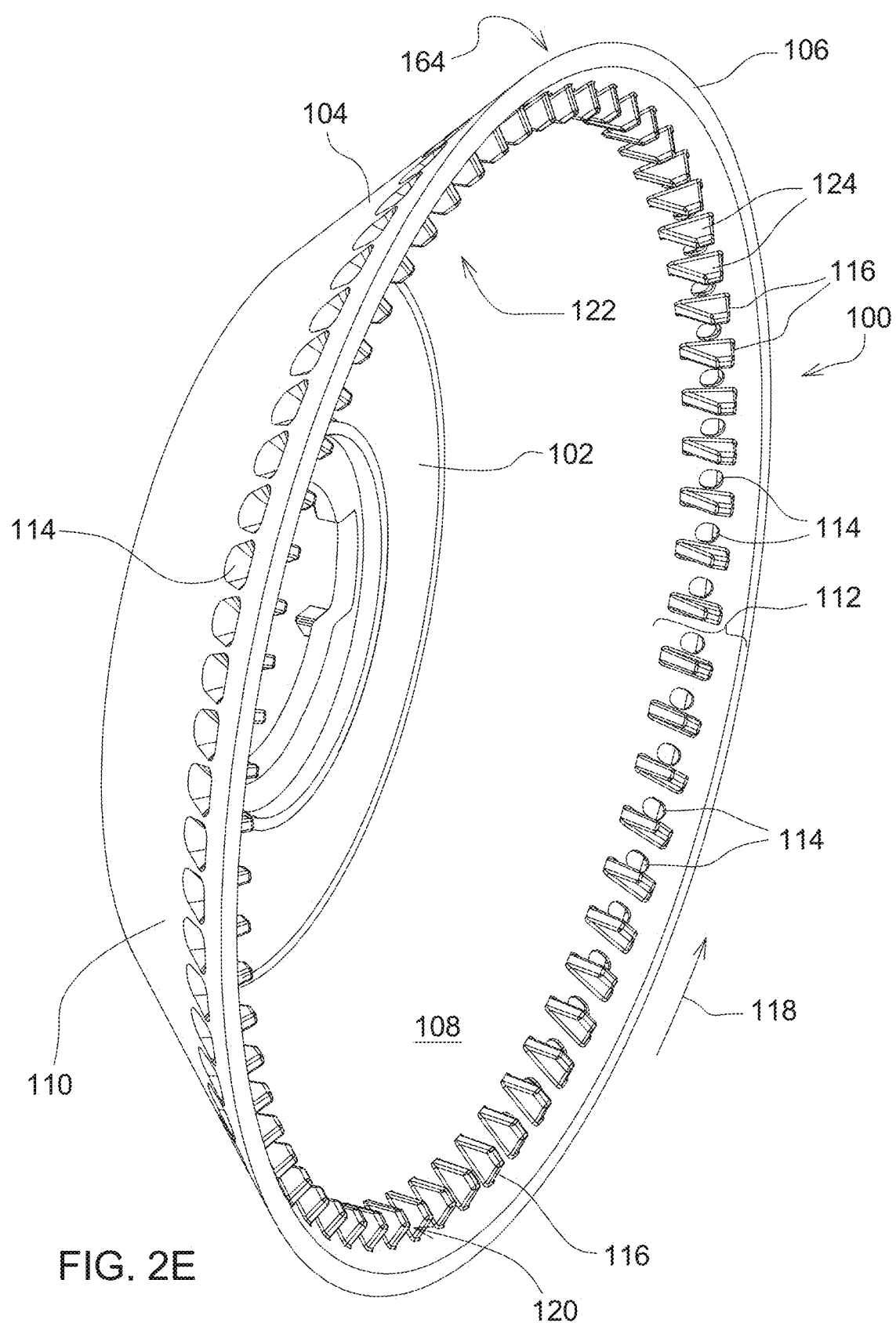
Figure 2H:
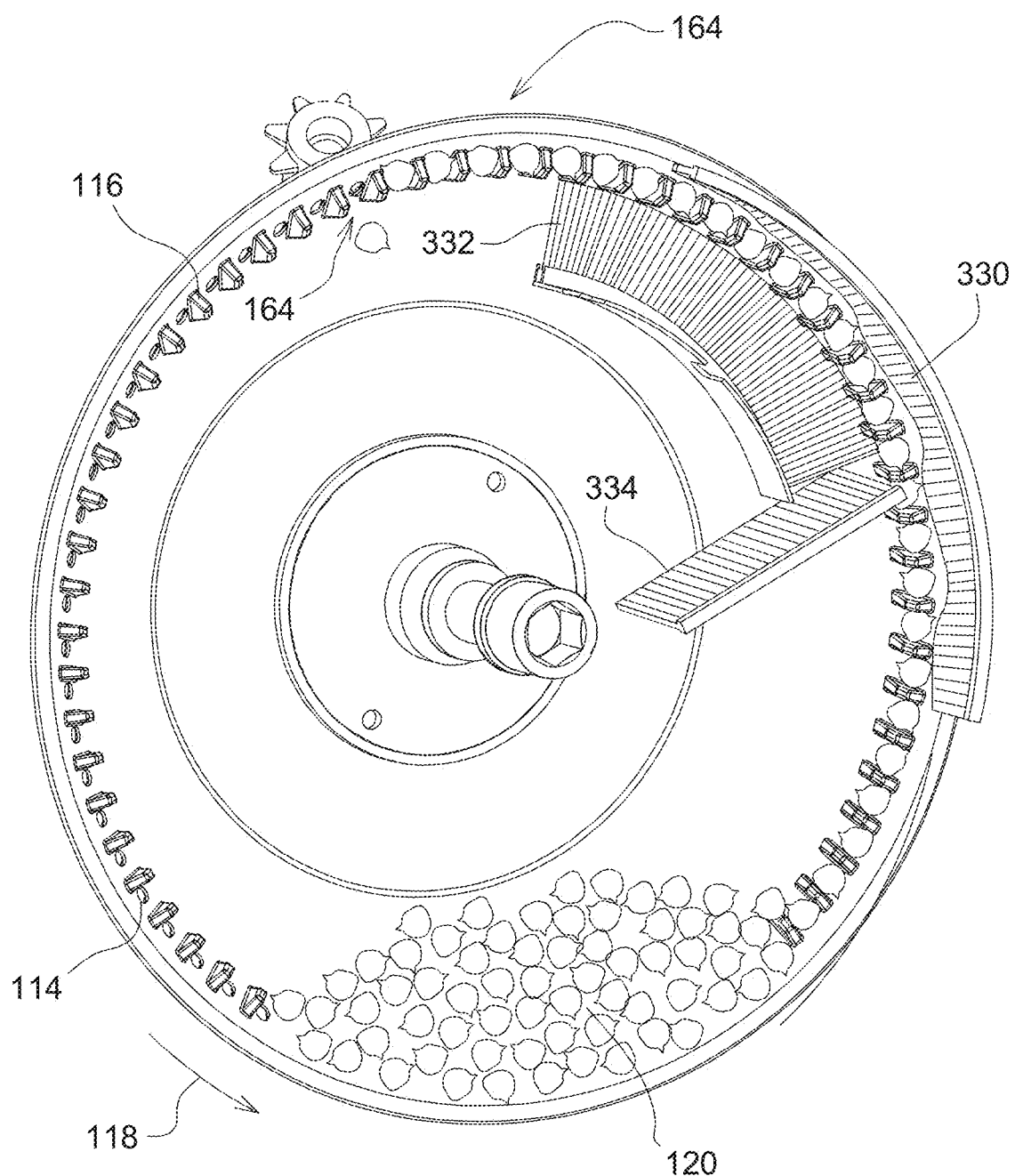
Figure 2L:
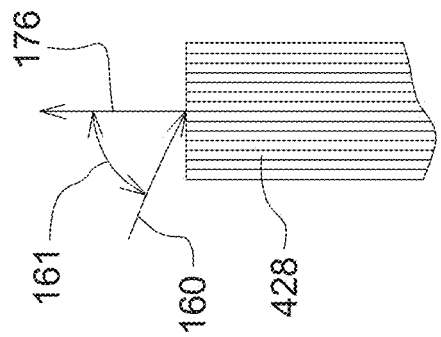
Figure 2M:
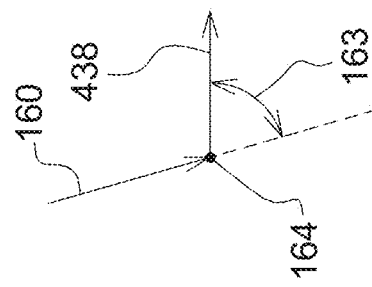
Figure 2K:
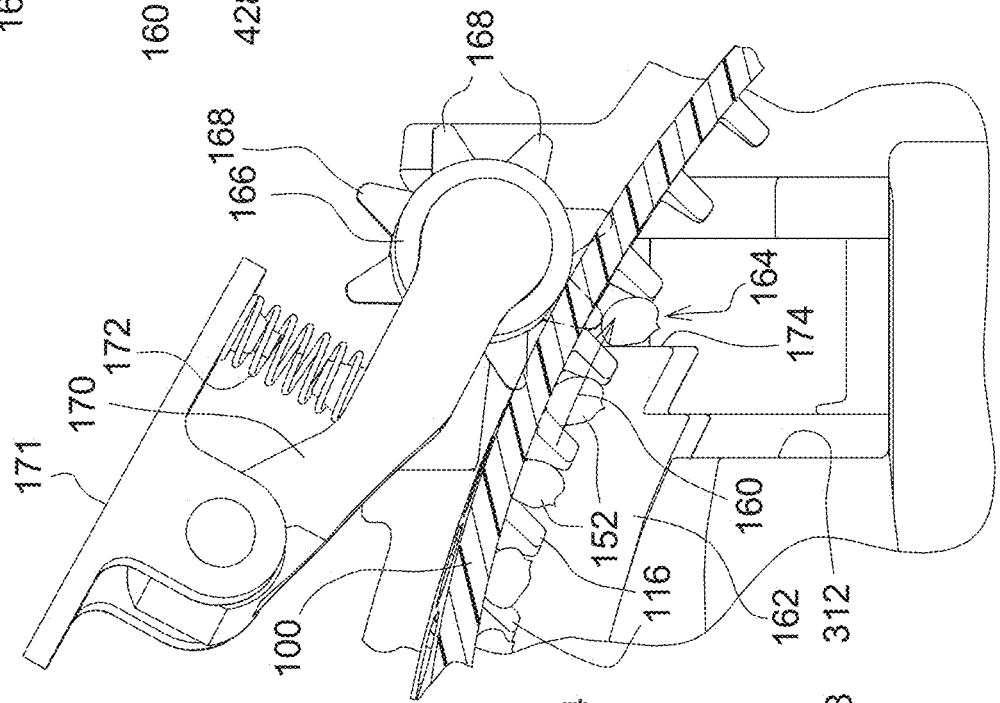
Figure 2J:
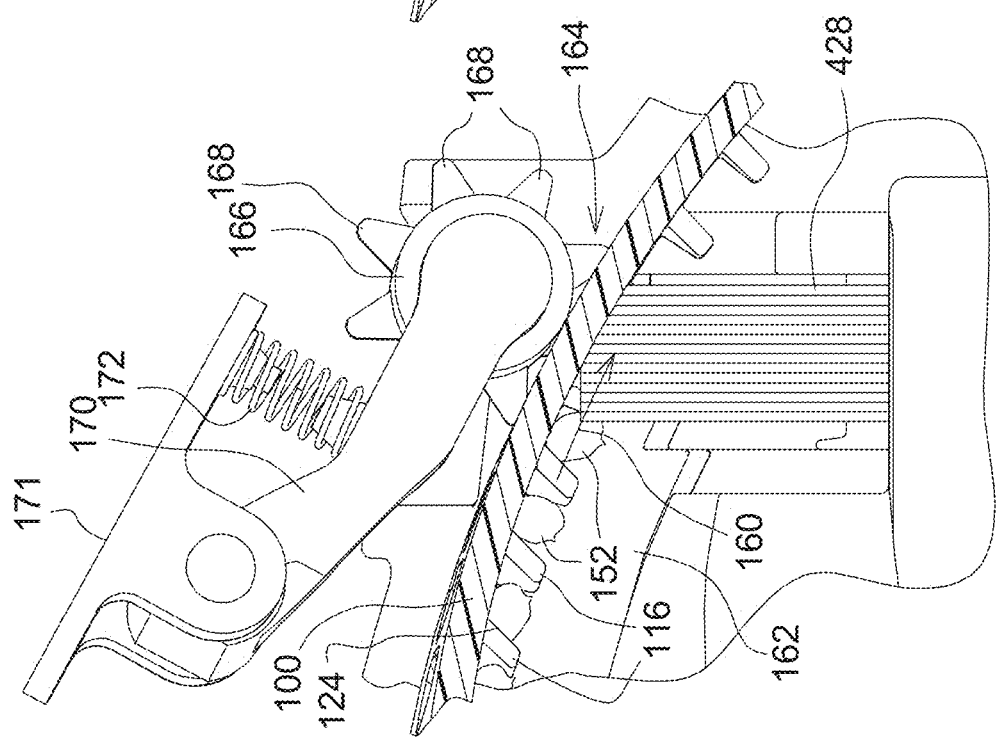
Figure 2N:
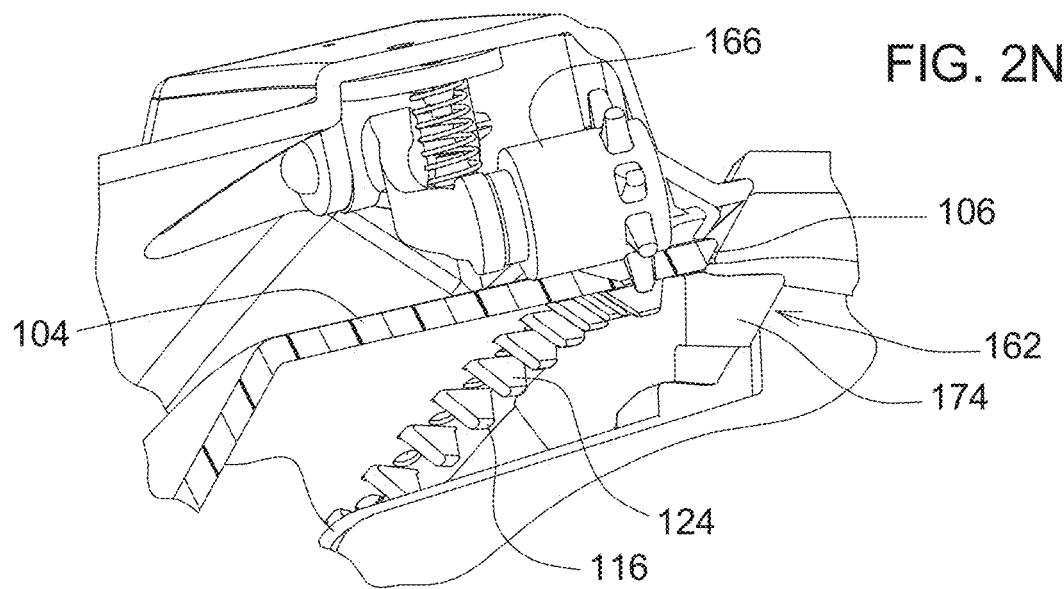
Figure 2O:
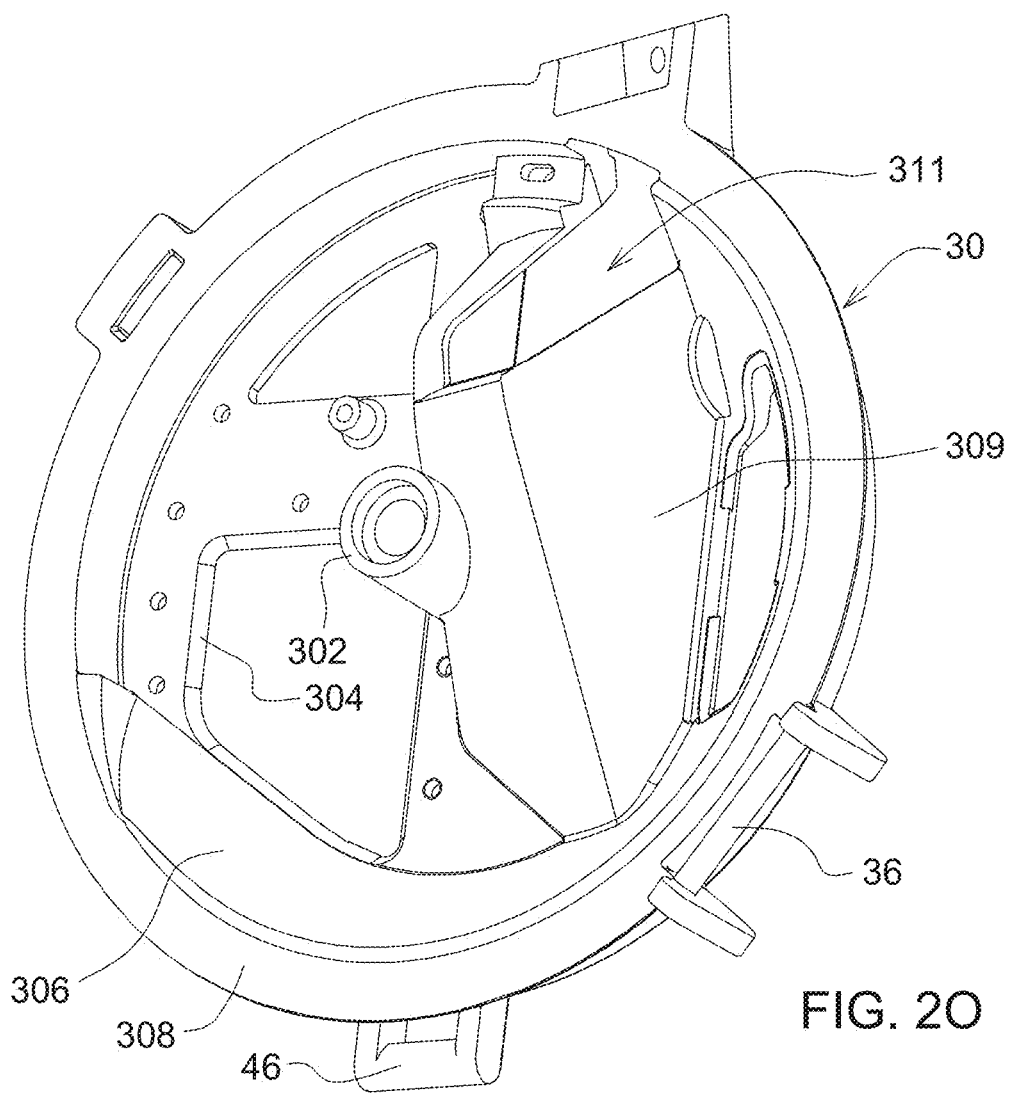
Figure 2R:
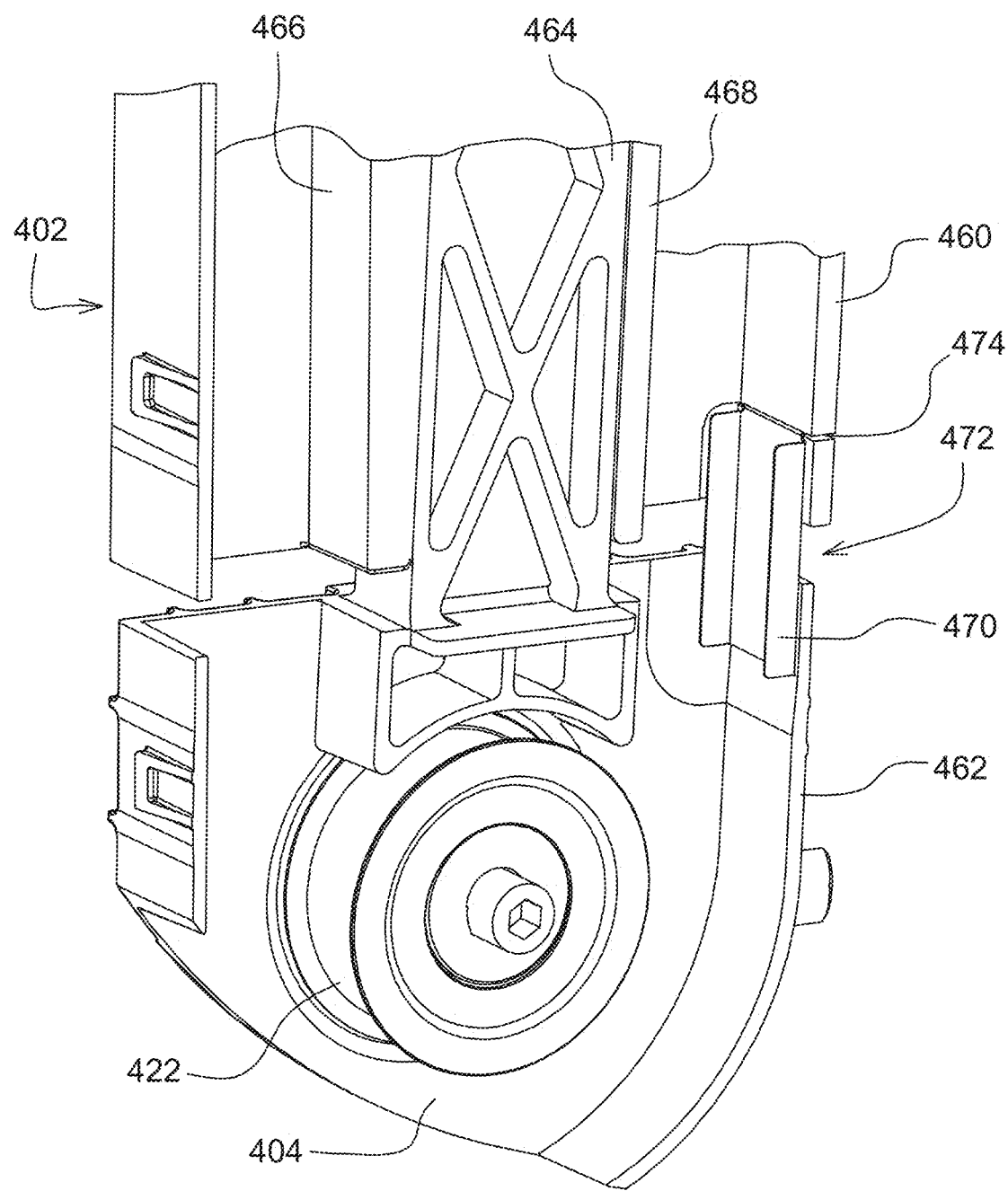
Figure 2S:
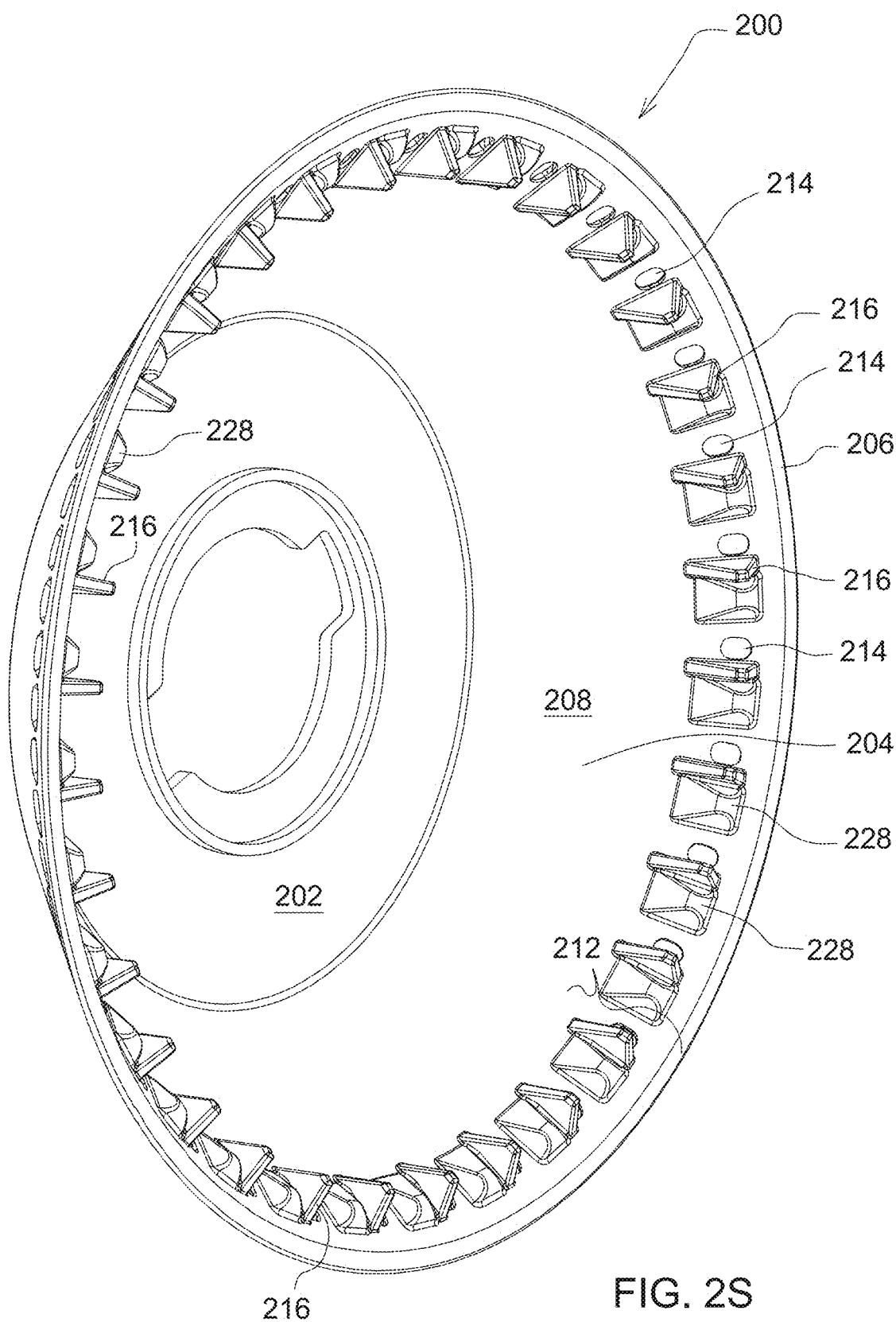
Figure 2T:
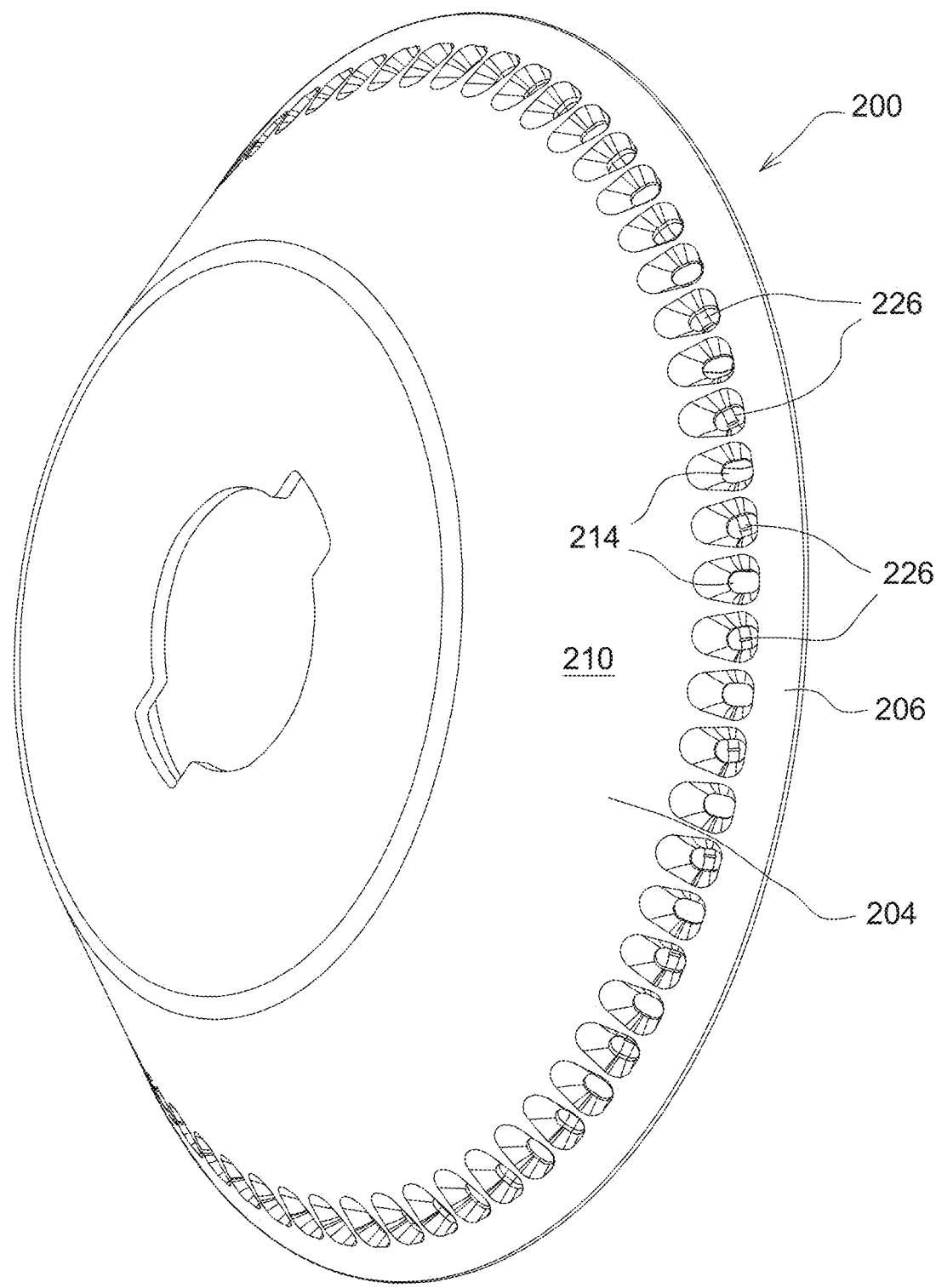

FIGS. 2A-2T illustrates a row unit according to at least one example embodiment.

As shown in FIG. 2A, the row unit includes the seed meter 24 and the seed delivery system 400.

The seed meter 24 includes a housing 30 (FIG. 2B) and a cover member 34. The housing 30 and the cover member 34 are coupled to one another by complementary hinge features 36 and 38 (see FIG. 2D) on the housing and cover member respectively. Hinge feature 36 includes a pivot pin 37 coupled to the housing while the hinge feature 38 is an integrally formed hook that wraps around the pivot pin allowing the cover member 34 to pivot about the axis of the pin 37. An elastomeric latch member 40 is coupled to the housing 30 and has an enlarged portion 42 that is seated into a socket 44 formed in the cover member to hold the cover member in a closed position on the housing 30.

The housing 30 is formed with a second hinge element in the form of a pivot pin 46 (FIG. 2B). Pivot pin 46 is seated into a hook member 48 (FIG. 2C) of the mounting frame 50 attached to the frame member 18. This allows the seed meter 24 to pivot relative to the planting unit frame member 18 about an axis 52. A drive spindle 54 is carried by the housing 30 and has a drive hub 56 (FIG. 2D) on the end thereof. The drive spindle 54 couples to the output shaft 58 of electric motor 60 to drive the seed meter when in the assembled position shown in FIG. 2B. The seed meter 24 is coupled to the delivery system by a latch mechanism 68 including a metal rod 70 having a hook at one end seated into an aperture in the meter housing 30 when latched. The delivery system further has a mounting hook 72, partially shown in FIG. 2, which attaches to the planting unit frame member 18 to support the delivery system.

The seed delivery system 400 is driven by an electric motor 80, also carried by the mounting frame 50. The output shaft of the brush motor 80 is connected to the delivery system through a right-angle drive 82. While electric motors have been shown to drive both the seed meter and the seed delivery system, it will be appreciated by those skilled in the art that other types of motors, such as hydraulic, pneumatic, etc. can be used as well as various types of mechanical drive systems.

With reference to FIG. 2E, a metering member 100 of the seed meter is shown in greater detail. These metering member 100 is shown as a single piece, concave bowl shaped body. The bowl shaped body has a base portion 102 from which extends a sidewall 104. Sidewall 104 terminates in an outer edge 106. The sidewall has a radially inner surface 108 and a radially outer surface 110. Adjacent the outer edge 106, the sidewall has a rim portion 112 shown by the bracket in FIG. 2E. The rim portion 112 extends radially outwardly and axially toward the outer edge 106. In the rim portion 112, there is an annular array of apertures 114 that extend through the sidewall between the inner and outer surfaces 108 and 110. The metering member 100 is mounted in the meter housing for rotation in the direction of the arrow 118 in FIG. 2E. In operation, as the metering member rotates, individual seeds from a seed pool 120 located at a bottom portion of the metering member are adhered to the apertures 114 on the inner surface 108 of the sidewall and sequentially carried upward to a release position 164 at an upper portion of the metering member. Thus, the inner surface is also known as the seed side of the metering member. A series of raised features or projections, such as paddles 116, extend from the inner surface 108 of the sidewall 104 typically with one paddle located behind each aperture 114 in the direction of rotation. Each paddle forms a confronting surface 124 behind the associated aperture in the direction of rotation to push the seed adhered to the aperture into the delivery system as described below. As explained above, it is the rim portion 112 of the metering member that performs the function of drawing individual seeds from the seed pool and sequentially moving seed to the release position to supply seed individually to the seed delivery system 400.

The base portion 102 of the metering member contains a central drive aperture 130 (FIG. 2D) used to mount the metering member on a rotational drive hub 56 for rotation about the axis 132 in a manner similar to mounting a flat seed disk in a seed meter as is well known. When mounted to the housing 30, the metering member 100 cooperates with the housing to form a trough to hold the seed pool 120 as described more fully below. The axis 132 is inclined to both a horizontal plane as well as to a vertical plane extending fore and aft of the seeding machine and a vertical plane extending transversely to the seeding machine.

With reference to FIG. 2F, the metering member 100 is shown in a sectional view. The base portion 102 is a generally planar while the rim portion 112 of the inner surface of the sidewall 104 is outwardly flared, that is, extending both radially outward and axially. As shown in FIG. 2F, the rim portion is frusto-conical. Alternatively, as shown in FIG. 2G in connection with a metering member sidewall 104', the inner surface of the sidewall rim portion 112 may be frusto-spherical in shape. Furthermore, while the rim portion 112 has been shown as being outwardly flared, the rim portion could be generally cylindrical without any outward flair, that is, extending only axially.

The metering member 100 can be formed as one piece or constructed of multiple pieces. The metering member can be most easily molded of plastic such as polycarbonate, nylon, polypropylene or urethane. However, other plastics can be used as well as other materials such as metal, etc. The metering member 100 is sufficiently rigid to be self-sustaining in shape without additional supporting structure. As a self-sustaining, the metering member may be rigid or the metering member may be flexible to change shape when acted upon in a manner similar to the flexible seed disk of U.S. Pat. No. 7,661,377, the entire contents of which are herein incorporated by reference.

As previously mentioned, the metering member 100 can be mounted to a drive hub through the central drive aperture 130 in the base portion 102. Mounting through the central drive aperture 130 provides both mounting support of the metering member as well as the rotational drive of the metering member. Alternatively, support for the metering member can be provided on the outer surface of the sidewall. A groove may be formed in the outer surface of the sidewall to receive rollers that support the metering member. If the groove is also formed with drive teeth, one of the rollers could be driven by a motor to rotate the metering member. With such alternative arrangements possible, it is not necessary that the metering member have a base portion. The function of metering seed is performed by the sidewall and thus, the sidewall is the only required portion of the metering member.

As shown in FIG. 2F, the metering member 100, when mounted in the meter housing, is oriented at an incline to the vertical as shown. In this orientation, the apertures 114 lie in a plane 150 inclined at an angle α relative to vertical. In this orientation, an upper portion 148 of the metering member overhangs or extends beyond a lower portion 154. As described below, this allows access to the upper portion 148 of the metering member for the mechanical seed delivery system 400. As shown, the angle α is approximately 24 degrees. However, any angle will suffice as long as the upper portion 148 extends beyond the lower portion sufficiently for access for the seed delivery system from below the metering member at the seed release position.

The seed pool 120 is formed at the bottom of the metering member 100 as shown in FIG. 2H. Vacuum is applied to the outer surface 110, causing individual seeds to be adhered to the apertures 114 as the apertures travel through the seed pool. As the metering member rotates as shown by the arrow 118, seed is moved upward to a release position 164 at the upper portion 148 of the metering member. The release position is slightly past the top or 12 O'clock position on the circular path of travel of the seed such that the seed is moving somewhat downward at the release position. This facilitates the seed's entry into the delivery system as more fully described below. Also, by being past the top point of the path, the delivery system is off center relative to the metering member providing clearance between the delivery system and the seed meter drive. At the release position 164, the inner surface of the rim portion of the metering member is facing downward such that seed is adhered beneath the metering member or is hanging from the metering member. See FIG. 2I. The seed delivery system 400 is also positioned beneath the upper portion of the metering member at the release position 164 to take the seed from the metering member as shown in FIG. 2J.

Seed delivery system 400 includes a housing 402 having a left sidewall 404 (see FIG. 2R) and a right sidewall 406 (see FIG. 2B). The terms left and right are used in relationship to the direction of travel of the seeding machine shown by the arrow 408. Connecting the left and right sidewalls to one another is an edge wall 410. An upper opening 416 is formed in the edge wall and sidewalls to allow seed to enter into the housing 402. A lower opening 418 is provided at the lower end forming a discharge location 413 for the seed. A pair of pulleys 420 and 422 are mounted inside the housing 402. The pulleys a support a belt 424 for rotation within the housing. One of the two pulleys is a drive pulley while the other pulley is an idler pulley. The belt has a flexible base member 426 to engage the pulleys. Elongated bristles 428 extend from the base member 426. The bristles are joined to the base member at proximal, or radially inner, ends of the bristles. Distal, or radially outer, ends 430 of the bristles touch or are close to touching the inner surface of the housing edge wall 410.

In at least one example embodiment, one or more seed sensors 370 is in the edge wall 410 or mounted to the edge wall 410. The seed sensor 370 may be a reflective seed sensor. The seed sensor 370 may include an optical sensor disposed to detect light passing through a sensing region 370a between the flights. The seed sensor 370 may additionally include a light source such as an LED for providing light waves to be reflected by a seed 151 for detection by the sensor. Alternatively, a separate light source (not shown) may be disposed behind the brush (to the left in the perspective of FIG. 2I) so as to transmit light through the brush toward sensor 370. In any case, the sensor 370 generates a signal which changes due to the presence of the seed 151 in the sensing region 370a.

As shown at the top of FIG. 2I, a seed 152 is at the release position on the metering member 100 and has just been inserted into the bristles 428 of the delivery system. At the release position, the rim portion 112 of the metering member sidewall 104 is generally tangent to the stationary inner surface 412 across which the brush bristles 428 sweep. The surface 412 is on a latch portion 66 of the housing 30. The surface 412 is a continuation of the inner surface 414 of the delivery system housing 402. Once the seed is captured in the delivery system, the seed moves in the direction of the belt, shown by the arrow 417. The direction of travel of the seed immediately upon capture by the seed delivery system 400 is shown by the vector 438.

Prior to release of the seed from the metering member, the seed is moving in the direction of vector 160 which is slightly downward into the bristles 428. With reference to FIG. 2L, the vector 160 of the seed direction is at an angle 161 of about 60 degrees to the length of the bristles 428 shown by the arrow 176. As shown in FIG. 2J, the brush belt is positioned so that seed enters the bristles at the corner of the brush belt. The brush can be positioned so that the seed enters the brush through the distal ends of the bristles or through the side of the bristles.

The relationship between the seed direction vector 160 on the metering member and the seed direction vector 438 when the seed is first in the brush belt is shown in FIG. 2M illustrating the two vectors in the plane containing both vectors at the release position 164. An angle 163 between the vectors is at least 35 degrees and preferably between 50 degrees and 80 degrees. This shows the cross-feed of the seed into the bristles, meaning that the seed, prior to the release position is moving substantially in a different direction than the brush bristles are moving. This is also the relationship by which the bristles sweep over the inner surface of the sidewall relative to the travel direction of seed.

FIGS. 2J and 2K show a blocking member 162 carried by the meter housing 30. Blocking member 162 is positioned adjacent a path of travel of seed 152 leading to the release position 164 and prevents movement of seed from the metering member prior to reaching the release position. Once the seed has passed the end 174 of the blocking member 162, the seed is free to move with the brush bristles in the direction of the vector 438 in FIG. 2I. The blocking member ensures that the seed is consistently feed into the brush belt in the center of the belt, widthwise, rather than allowing the seed to enter the belt at random positions across the belt width. As shown in FIG. 2N, the blocking member is located beneath the sidewall 104 of the metering member 100 between the paddles 116 and the outer edge 106 of the metering member. The confronting surfaces 124 of the paddles 116 push seed into the brush bristles. The paddles or projections 116 travel further into the brush bristles as the projections cross the width of the brush as seen in FIG. 2J. Once seed is in the brush bristles, the seed is swept over the inner surface of the metering member, from the apertures 114 to the outer edge 106 of the metering member in the direction of the vector 438. The delivery system could be arranged to sweep seed in the opposite direction, that is, away from the outer edge 106 of the metering member.

To further ensure consistent release of seed from the metering member and hand-off to the delivery system, an ejector 166, carried by the cover member 34 rides on the outer surface of the metering member rim portion. See FIGS. 2J, 2K and 2N. The ejector 166 is in the form of a star wheel having a number of projections 168. The projections 168 extend into the apertures 114 from the outer surface 110 of the sidewall 104 and force seed out of the apertures 114. The ejector is caused to rotate by rotation of the metering member 100 due to the projections 168 engaging in the apertures 114. The ejector is mounted to the cover member 34 via a pivot arm 170 and bracket 171. The ejector 166 is biased against the metering member by a spring 172.

Turning attention once again to FIG. 2C, a flexible seal 180 is shown on the inner side of the cover member 34. This seal bears against the outer surface 110 of the metering member 100 forming a vacuum chamber within the interior 182 of the seal. A first portion 184 of the seal is spaced radially further out on the metering member than is the second portion 186 of the seal. In the area of the seal first portion 184, vacuum is applied to the apertures 114, causing seed to adhered thereto. There is no vacuum applied to the apertures adjacent and outside of the seal second portion 186. A port 188 in the cover member 34 is adapted to connect the interior of the cover member to a vacuum source in a known manner for a vacuum seed meter. The seed release position 164 is within the vacuum chamber. Thus, the brush belt and the ejector are working in opposition to the vacuum applied to the apertures 114 to release the seed from the metering member.

With reference to FIG. 2O, The inside of the housing 30 is shown. The housing includes a central boss 302 for the drive spindle 54. The housing also includes an opening 304 to receive seed from a mini-hopper, not shown, mounted to the outside of the housing and surrounding the opening 304. Below the opening 304, the housing wall forms a ramp 306 extending downward toward the lower end 308 of the housing. The ramp cooperates with the inner surface 108 of the metering member to hold the seed pool 120. The housing includes an inward projection 309 forming a cavity 314 (FIG. 2P) on the outside of the housing into which the upper end if the seed delivery system 400 is placed. The projection 309 is open at the upper end, forming a downward looking opening 312 from the interior of the housing to the exterior. This opening 312 allows the brush belt 424 to access the inner surface of the 108 of the metering member and carry seed from the housing.

FIG. 2P illustrates the orientation of the metering member and the cooperation of the housing 30 and metering member 100 to form a trough for the seed pool 120 at the lower end of the metering member. FIG. 2P shows the orientation of the metering member when the seeding machine 10 is on level ground. At the lower end of the metering member, the sidewall 104 is inclined to the vertical such that the inner surface 108 is at an angle d to the vertical vector 126. As illustrated in FIG. 2P, the inner surface is approximately 21 degrees from vertical. The orientation of the housing adjacent the metering member, forming the other side of the trough, is not critical. Seed from the seed pool 120 sits on top of the inner surface 108 and a component of the force of gravity is perpendicular to the inner surface 108. When operating on a hillside, if the meter is tilted clockwise or counter-clockwise, as viewed in FIG. 2P, the inner surface 108 remains inclined and gravity still has a component perpendicular to the inner surface. This is in contrast to a typical disk seed meter shown in FIG. 2Q with a vertically oriented disk 320 cooperating with a housing wall 322 for form a seed pool 324. If this meter is tilted counterclockwise as viewed, seed from the pool will still bear against the disk. However, if the meter is tilted clockwise, seed from the pool will fall away from the disk, allowing for decreased metering performance in terms of seed being picked-up by the disk. Evaluation of the meter has shown improved meter performance on a hillside when the angle d is as small as 5 degrees and as large as 75 degrees. Better performance is achieved when the angle d is between 10 degrees and 50 degrees while the optimum performance is in the range of 20 degrees to 40 degrees. This last range provides considerable tilting of the seed meter on a hillside in any direction before performance begins to decrease.

At the upper end of the metering member, at the release position 164, the inner surface 108 has an angle f to a downward vertical vector 128 in the range of 50 degrees to 90 degrees with the closer to 90 degrees being the better for hand-off of seed from the metering member to the brush belt. As shown, the angle f is approximately 68 degrees. The different orientations of the inner surface 108 relative to vertical at the seed trough and at the release position is accomplished with a metering member that is rigid. Such variation is not possible with the flat disk metering member shown in FIG. 2Q.

As described above, seed is adhered to the apertures 114 in the metering member due to the vacuum applied to the outer surface of the metering member creating a pressure differential on opposite sides of the metering member. As an alternative to vacuum on the outer side of the metering member, the pressure differential can be created by a positive pressure between the housing 30 and the metering member 100. Such a system would require seals between the metering member 100 and the housing 30 to create a positive pressure chamber. In a positive pressure arrangement, the cover member 34 only serves as a cover for the rotating metering member.

It is possible that more than one seed will be adhered to a given aperture 114. To prevent more than one seed at a time from being transferred to the brush belt, a pair of doubles eliminators or singulating members are attached to the housing 30 along the path of seed from the seed pool to the release position 164. The singulating members are in the form of brushes 330 and 332 (FIGS. 2D and 2H). Brush 330 has bristles extending substantially axially and brushes seed on the apertures 114 by extending inwardly from the outer edge 106 of the metering member. The bristles of brush 330 are of varying length, to engage the seed at several discrete locations along the length of the brush 330. The brush 332 has bristles extending substantially radially and engaging the inner surface of the metering member sidewall inside of the paddles 116 and extend along the sidewall to the apertures 114. Both brushes 330 and 332 act to slightly disturb seed on the aperture and cause excess seed to fall off. Once removed, the excess seed falls back to the seed pool 120. The brushes can be fixed in position or they can be adjustable to change the degree to which the brushed disturb seed on the metering member. A third brush 334 is shown which extends generally radially of the metering member. The brush 334 serves to define a boundary to the seed pool 120. The brushes 330, 332 and 334 are mounted to the housing 30.

Returning again to FIG. 2I, once seed is captured or trapped in the bristles 428, the delivery system controls the movement of seed from the seed meter to the discharge location. The seeds are held in the bristles such that the seeds can not move vertically relative to the bristles 428 or relative to other seeds in the delivery system. Particularly, during travel of the seeds along the vertical side of the delivery system, the seeds are held on at least the top and bottom of the seeds to prevent any relative movement between the seed and the brush belt. Thus, the relative position of the seeds to one another is not affected by dynamics of the planting unit while moving across a field. The seed is carried by the bristles from the upper opening 416 to the lower opening 418 with the movement of the seed controlled at all times from the upper opening to the lower opening.

The lower opening 418 of the delivery system housing is positioned as close to the bottom 446 of the seed trench or furrow 448 as possible. As shown, the lower opening 418 is near or below the soil surface 432 adjacent the seed furrow. The bottom of the delivery system should be no more than one or two inches, (2.5-5 cm) above the soil surface 432. If possible, the lower end of the delivery system should be below the soil surface 432. The housing edge wall 410 forms an exit ramp 434 at the lower opening 418. The lower opening 418 and the ramp 434 are positioned along the curve in the belt path around the pulley 422. The seed, being carried by the bristle's distal ends, increases in linear speed around the pulley 422 as the distal ends of the bristles travel a greater distance around the pulley 422 than does the base member 426 of the belt. This speed difference is shown by the two arrows 441 and 442.

At discharge, the seed has a velocity shown by the vector V. This velocity has a vertical component $V_V$ and a horizontal component $V_H$. The belt is operated at a speed to produce a horizontal velocity component $V_H$ that is approximately equal to, but in the opposite direction of, the seeding machine forward velocity shown by arrow 408. As a result, the horizontal velocity of the seed relative to the ground is zero or approximately zero. This minimizes rolling of the seed in the seed trench.

Seed can be inserted into the brush bristles at essentially an infinite number of positions. This enables the brush to be operated at a speed to produce the desired horizontal velocity component to the seed, independent of the seed population. The seed meter, on the other hand, may be operated at a speed that is a function of both the forward travel speed of the seeding machine and the desired seed population. Because the belt 424 can be loaded with seed at essentially an infinite number of positions, the belt speed can be operated independently of the seed meter speed. In some example embodiments, the belt speed is timed to the seed meter speed to ensure that one or more flights pass the seed meter for each seed that is discharged from the meter.

While it is desirable to match the seed rearward velocity to the seeding machine forward velocity to minimize seed relative velocity to the soil, with some seed types, the brush belt may be operated at a different speed to ensure the seed is discharged from the brush bristles.

The interior of the lower portion of delivery system housing is shown in FIG. 2R. The delivery system housing 402 is a two-piece housing having an upper housing member 460 and a lower housing member 462. The lower housing member carries the lower pulley 422. The lower housing member has an upwardly extending rod portion 464 that slides within a channel formed by walls 466 and 468 in the upper housing member. Springs, not shown, push downward on the rod portion 464 to bias the lower housing member downward. The brush belt 424, wrapped about the pulleys 420 and 422, holds the upper and lower housing members together. The belt 424 is tensioned by the springs acting on the rod portion 464. A U-shaped metal strip 470 is attached to the upper housing member 460 and bridges the gap 472 between the upper and lower housing members to provide a continuous surface for holding seed in the housing between the upper opening 416 and the lower opening 418. The metal strip has a tab at the upper end thereof bent over and inserted into a slot 474 in the upper housing member 460 to hold the metal strip 470 in place. A fastener, such as a nut and bolt, may be placed through the rod portion 464 and the upper housing member 460 to fix the upper and lower housing members together.

Different metering members may be used for different seed types. The metering member 100 is intended for soybeans and other crops planted with a fairly close seed spacing. Corn, which is planted at a greater seed spacing uses a metering member 200 shown in FIGS. 2S and 2T. Metering member 200 is constructed in a similar fashion as metering member 100 and like components are given the same reference numeral with the addition of 100. However, metering member 200 has half the number of apertures 214 as the metering member 100. To avoid the need to replace the ejector 166 when changing metering members, the metering member 200 has recess 226 extending into the sidewall 204 on the outer surface 210 of the sidewall between each aperture 214. The recesses 226 provide clearance for the projections 168 of the ejector 166 that are arranged to be inserted in each aperture 114 of the metering member 100. The recesses 226 are not open to the inner surface 208 of the sidewall 204. Thus there are additional projections 228 on the inner surface of the sidewall 204 between the apertures 214. Alternatively, the projections 228 and the paddles 216 can be formed as a single projections extending from the inner surface 208.

Figure 3:
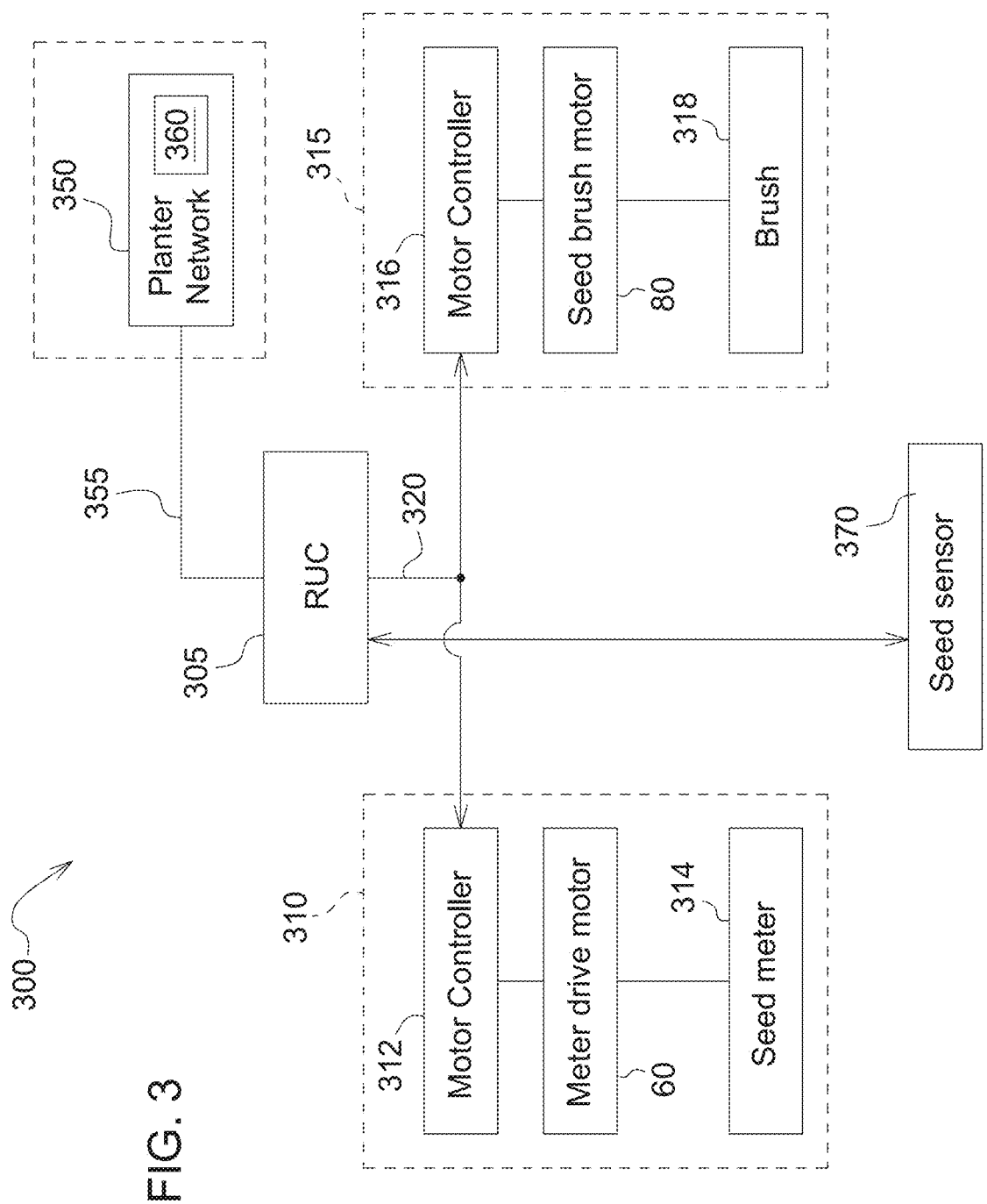

FIG. 3 illustrates a control system of a seed meter drive and a delivery system drive according to at least one example embodiment.

As shown in FIG. 3, a control system 300 includes a row unit controller (RUC) 305, a seed meter drive (a seed meter system) 310 and a delivery system drive (also referred to as a delivery system) 315. The seed meter drive 310 may include a motor controller 312, the meter drive motor 60 and a seed meter 314 (e.g., seed meter). The delivery system drive 315 may include a motor controller 316, the brush motor 80 and a brush 318.

The motor controller 312 and the meter drive motor 60 may form a first integrated smart motor and the motor controller 316 and the brush motor 80 may form a second integrated smart motor.

The RUC 305 may communicate with the seed meter drive 310 and the delivery system drive 315 over a network bus 320. The control system 300 may be a portion of a Controller Area Network (CAN) and the network bus 320 may be a CAN bus.

The RUC 305 is preferably in electrical communication with the motor controller 316 of the delivery system drive 315.

The RUC 305 is preferably in electrical communication with the motor controller 312 of the seed meter drive 310.

The meter drive motor 60 may comprise any apparatus known in the art for driving seed meters at a desired speed such as a hydraulic drive or electric drive. As an example, the meter drive motor 60 may comprise an electric motor mounted on or near the meter drive motor 60.

Figure 4:
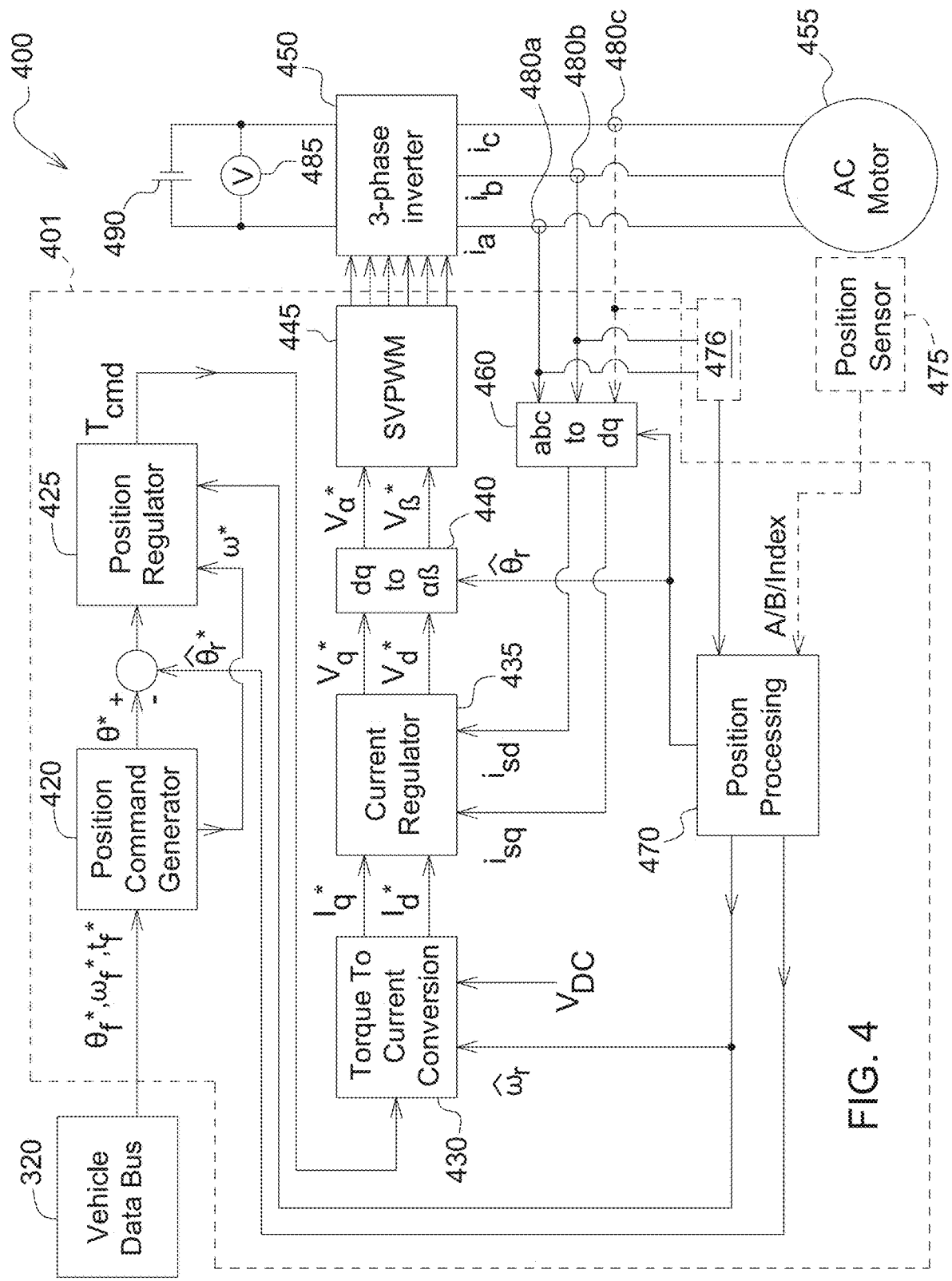

In an example embodiment, the seed meter drive 310 preferably includes an encoder (e.g., a hall-effect sensor) for sensing the rotor position of the meter drive motor 60. FIG. 4 illustrates an example. In an example embodiment, the delivery system drive 315 preferably includes an encoder (e.g., a hall-effect sensor) for sensing the rotor position of the brush motor 80. FIG. 4 illustrates an example.

The RUC 305 is also preferably in electrical communication with a planter network 350 over another CAN bus 355. The planter network 350 may include a speed source 360. The speed source 360 may comprise a GPS system, a radar speed sensor, or a wheel speed sensor.

The RUC 305 receives ground speed, seed population, row spacing, and planting enable/disable commands from the planter network 350. The RUC 305 provides commands to the seed meter drive 310 and the delivery system drive 315 based on the ground speed, seed population, row spacing, and planting enable/disable commands from the planter network 350. The seed sensor 370 (reflective seed sensor) provides a digital pulse directly measured by the RUC 305 indicating the presence of a seed. The size of the seed is thus derived by the speed of the brush and the width of the digital pulse. The RUC 305 may add a timestamp to the seeds detected by the seed sensor 370.

In at least one example embodiment, the RUC 305 is in electrical communication with one or more seed sensors 370 adapted for mounting to the metering member 100. In some example embodiments, the seed sensor 370 only communicates with the RUC 305. In other example embodiments, the seed sensor 370 may also be in electrical communication with the motor controller 312 and the motor controller 316 over the bus 320.

In at least some example embodiments, command synchronization occurs between a RUC and a motor controller over a vehicle data bus to improve seed control of planters. The RUC may generate at least one network message (e.g., a CAN message) indicating a future target. The future target may include one or more of the following: (a) a time target, (b) an angle or position target and (c) a speed (velocity) target of the seed.

In at least some example embodiments, clock synchronization occurs over the vehicle data bus 320 to improve communication accuracy. Namely, measurements and commands are included with appropriate global time references. Global time may refer to a time which is synchronized and standardized on a subnetwork such as the control system 300. In some example embodiments, timer synchronization may include the CAN bus 355 and the planter network 350.

The synchronization over the vehicle data bus 320 and the bus 355 may be done in accordance with Specification of Time Synchronization over CAN, AUTOSAR CP Release 4.3.1 (Dec. 8, 2017), the entire contents of which are hereby incorporated by reference.

Each seed can have its own respective target.

The seed velocity may depend on the ground speed of the vehicle and associated planter. A location-determining receiver (GPS or Global Satellite Navigation System) with differential correction data, real time kinematic correction data and/or precise point positioning may be used to provide ground speed of the vehicle and acceleration (e.g., via the location-determining receiver or integral accelerometers).

At least one example embodiment provides a system includes an electric machine (e.g., a motor), a memory storing instructions and at least one controller configured to execute the instructions to cause the system to obtain at least one message over a network, the at least one message indicating a target position for the electric machine and a target time associated with the target position, determine a position command and a speed command based on the target position and the target time, and control the motor based on the position command and the speed command.

In at least one example embodiment, the at least one controller is further configured to execute the instructions to cause the system to obtain a target speed in the at least one message, the target speed associated with the target time and the target position, and determine the position command and the speed command based on the target position, the target time and the target speed.

In at least one example embodiment, the target speed is based on a speed of a planter row unit.

In at least one example embodiment, the target position is associated with a seed being delivered to the ground and is an expected position of the rotor of the motor at which the seed is delivered to the ground.

In at least one example embodiment, the at least one controller is further configured to execute the instructions to cause the system to select a first mode of operation or a second mode of operation based on the target position and the target time and determine the position command and the speed command based on the selected mode.

In at least one example embodiment, the at least one controller is further configured to execute the instructions to cause the system to select the first mode of operation or the second mode of operation at each cycle.

In at least one example embodiment, the at least one controller is further configured to execute the instructions to cause the system to determine the position command and the speed command based on a Gramian method in the first mode of operation.

In at least one example embodiment, the at least one controller is further configured to execute the instructions to cause the system determine the position command and the speed command as:

$$\begin{bmatrix} \dot{\theta}^* \\ \dot{\omega}^* \end{bmatrix} = \begin{bmatrix} 0 & 1 \\ 0 & 0 \end{bmatrix} \begin{bmatrix} \theta^* \\ \omega^* \end{bmatrix} + \begin{bmatrix} 0 \\ 1 \end{bmatrix} u$$

$$A = \begin{bmatrix} 0 & 1 \\ 0 & 0 \end{bmatrix}, B = \begin{bmatrix} 0 \\ 1 \end{bmatrix}$$

$$u^*(t) = B^T e^{A^T(t-t_0)} W^{-1}(t_0, t_f^*)(x_f^* - e^{A(t-t_0)} x_0^*)$$

$$W(t_0, t_f^*) = \int_{t_0}^{t_f^*} e^{A(t_f^*-\tau)} BB^T e^{A^T(t_f^*-\tau)} d\tau$$

where a target $$x_f^* = \begin{bmatrix} \theta_f^* \\ \omega_f^* \end{bmatrix},$$

a command $$x_0^* = \begin{bmatrix} \theta_0^* \\ \omega_0^* \end{bmatrix}$$

and is determined by the motor controller, W is a Gramian matrix, u* is the acceleration used to construct the desired position profile of the position command θ* over time, $t_0$ is the time associated with the command $x_0$ (time at which a current position command $θ*_0$ and a current speed command $ω*_0$ are determined and used by the motor controller) at which the motor controller determines a new position command and a new speed command (the command $x*_0$ may then be updated to reflect the new position command and the new speed command). In an example embodiment, an initial value of $x*_0$ may be zero. In other example embodiments, the initial value of $x*_0$ may be set to the measured position.

In some example embodiments, the time $t_0$ and the command $x_0$ may be updated at each iteration of the controller performing the calculation of $x_f$. By updating the time $t_0$ and the command $x_0$ at each iteration (step), an error is reduced since it does not accumulate. However, example embodiments are not limited thereto.

In at least one example embodiment, the at least one controller is further configured to execute the instructions to cause the system to determine the position command and the speed command based on a bang-bang or hysteretic method in the second mode of operation.

In at least one example embodiment, the network is a controller area network (CAN) and the at least one controller is configured to obtain the at least one message over a CAN bus.

In at least one example embodiment, the system further includes a seed deliverer coupled to the motor.

In at least one example embodiment, the seed deliverer is a brush.

In at least one example embodiment, the system further includes a seed meter coupled to the motor.

In accordance with an example embodiment, FIG. 4 illustrates a drive system 400 including a controller 401 for controlling a machine such as a motor 455, a position sensor 475, a three-phase inverter circuit 450, a voltage sensor 485, a DC bus 490 and the motor 455. The voltage sensor 485 measures a DC bus voltage $V_{DC}$ of the DC bus 490.

The motor controller 312 and the motor controller 316 may have similar structure and functionality. The motor controller 401 may be representative of the motor controller 312 and 316. However, example embodiments are not limited thereto. The motor 455 may be the meter drive motor 60 or the brush motor 80.

It should be understood that the drive system 400 may include additional features that are not illustrated in FIG. 4. For example, the drive system 400 may include a rotor magnet temperature estimation module, a current shaping module, and a terminal voltage feedback module. The features shown in FIG. 4 are illustrated for the convenience of describing the drive system 400 and it should be understood that the drive system 400 should not be limited to the features shown in FIG. 4.

The drive system 400 includes electronic modules, software modules, or both. In an example embodiment, the drive system 400 includes the motor controller 401 to support storing, processing or execution of software instructions of one or more software modules. The motor controller 401 is indicated by the dashed lines in FIG. 4 and is shown in greater detail in FIG. 5.

The motor controller 401 is coupled to an inverter circuit 450. The inverter circuit 450 may be a three-phase inverter. The inverter circuit 450 includes a semiconductor drive circuit that drives or controls switching semiconductors (e.g., insulated gate bipolar transistors (IGBT) or other power transistors) to output control signals for the motor 455. In turn, the inverter circuit 450 is coupled to the motor 455. The motor 455 is associated with current transducers 480a and 480b. In some example embodiments, the motor 455 is associated with three current transducers 480a, 480b and 480c. In other example embodiments, the motor 455 is associated with the current transducers 480a and 480c or the current transducers 480b and 480c.

Throughout the specification, the current transducers 480a, 480b and 480c are referred to as current transducers. However, it should be understood that the current transducers 480a, 480b and 480c may be another type of current sensor.

The current transducers 480a and 480b and the motor 455 are coupled to the motor controller 401 to provide feedback data (e.g., current feedback data, such as phase current values ia and ib), raw position signals, among other possible feedback data or signals, for example. While only two current transducers 480a and 480b are described in some embodiments, it should be understood that the drive system 400 may implement the three current transducers 480a, 480b and 480c.

The motor controller 401 includes a position command generator 420, a position regulator 425, a torque to current converter 430, a current regulator 435, a converter 440, a pulse width generation module 445, a converter 460 and a position processor 470.

While the position command generator 420, the position regulator 425, the torque to current converter 430, the current regulator 435, the converter 440, the pulse width generation module 445, the converter 460 and the position processor 470 are described as executing functions, it should be understood that a data processor, such as a digital signal processor or a microcontroller, is specifically programmed to execute the position command generator 420, the position regulator 425, the torque to current converter 430, the current regulator 435, the converter 440, the pulse width generation module 445, the converter 460 and the position processor 470. For example, a data processor 564 is specifically programmed to execute the position command generator 420, the position regulator 425, the torque to current converter 430, the current regulator 435, the converter 440, the pulse width generation module 445, the converter 460 and the position processor 470, as will be described in FIG. 5.

In at least some example embodiments, the hardware executing the functions of the motor controller 401, the position sensor 475, the inverter circuit 450 and the DC bus 490 may be on a same printed circuit board.

In an example embodiment, the position command generator 420 receives target value commands from the RUC 305 over the vehicle data bus 320. For example, the position command generator 420 receives a target time $t*_f$, a target position $θ*_f$ and a target speed $ω*_f$ from the RUC 305. The target time $t*_f$ indicates a desired time at which the rotor position of the motor should be at the target $θ*_f$ and the target speed $ω*_f$. The target speed $ω*_f$ is tied to vehicle speed of the row unit. Including the target position $θ*_f$ and the target time $t*_f$ in the at least one message from the RUC 305 improves position tracking performance without increasing the rate at which commands are communicated over the network.

However, in some example embodiments, the RUC 305 sends a target speed $ω*_f$ and not the target position $θ*_f$ or the target time $t*_f$.

Based on the target time $t*_f$, the target position $θ*_f$ and the target speed $ω*_f$, the position command generator 420 determines a position command θ* and a speed command ω* for the motor. The generating of the position command θ* and the speed command ω* is described in greater detail below with respect to FIGS. 6A-6C.

The generation of the target time $t^*_f$, the target position $\theta^*_f$ and the target speed $\omega^*_f$, the speed command ω* and the position command θ* are also described in greater detail below with respect to FIG. 6A-6C.

The position regulator 425 receives input data representing a difference between an estimated position $\widehat{\theta_r}$, and the position command θ* as input.

The position regulator 425 converts the received input data into a torque command $T_{cmd}$. The torque command $T_{cmd}$ may be in Nm. The position regulator 425 determines a speed error (i.e., a difference between the speed command ω* and the measured speed $\widehat{\omega_r}$) and a position error (i.e., a difference between the position command θ* and the estimated position $\widehat{\theta_r}$). The position regulator 425 includes a proportional-integral-derivative (PID) controller. The PID uses the position error, the speed error, gains of the PID (e.g., integral gain, proportional gain and derivative gain) and a feedforward torque value to generate the torque command $T_{cmd}$.

While the term command is used throughout the specification, it should be understood that command refers to a target value.

Figure 5:
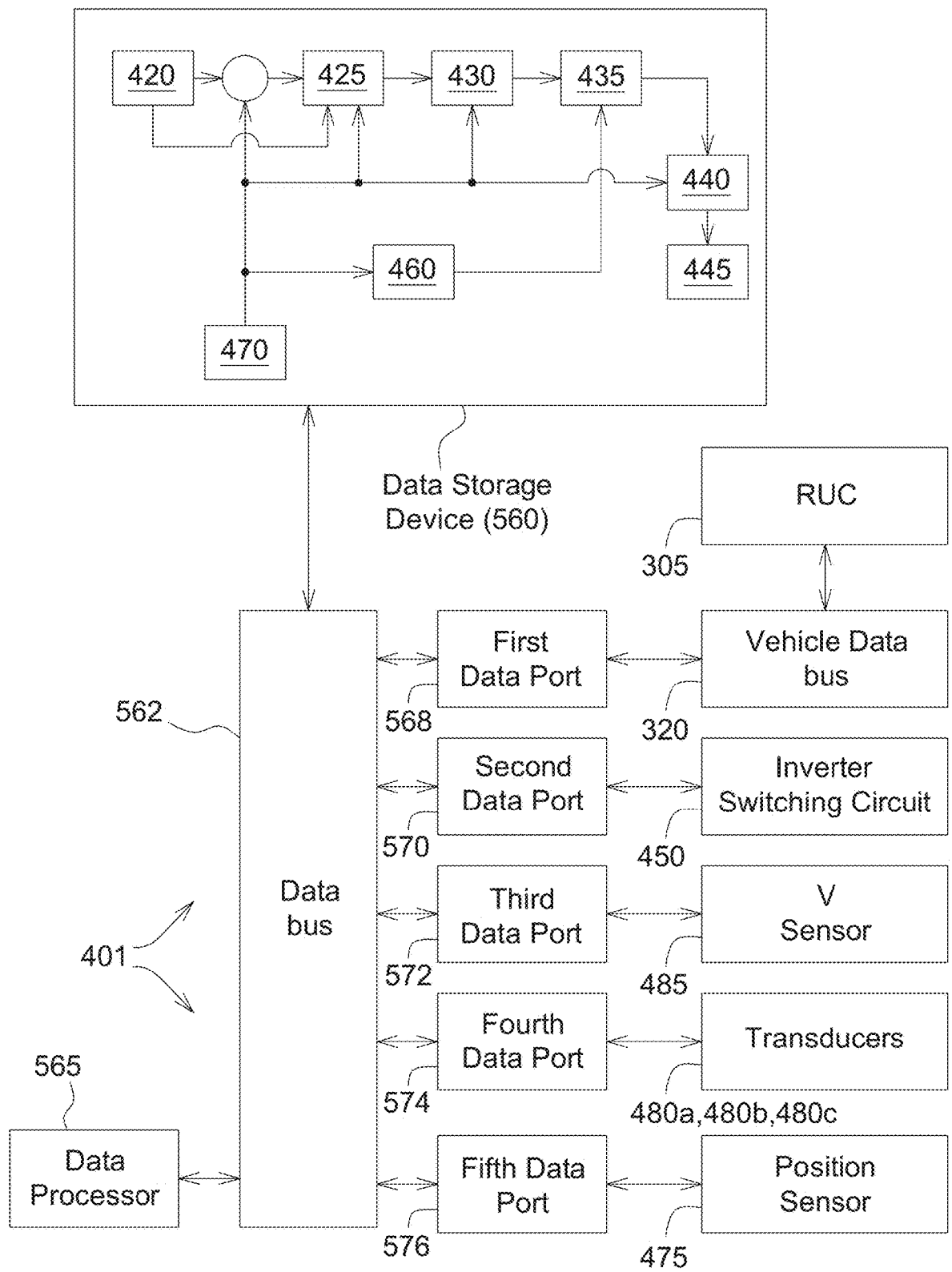

The torque to current converter 430 may be implemented as a look-up table in hardware and/or stored in memory (e.g., data storage device 560 of FIG. 5). Using the torque command $T_{cmd}$, a DC bus voltage $v_{DC}$ and a measured electric rotor speed $\omega_r$ of the motor 455, the torque to current converter 430 generates q-d axis current commands $i^*_q$ and $i^*_d$ using MTPA (maximum torque per amp) and/or MTPV (maximum torque per volt) curves.

During motor characterization, multiple current commands are used at different speed points, which generates the MTPA (maximum torque per amp) and MTPV (maximum torque per volt) curves. Generally, motor characterization is a procedure used to determine d-axis and q-axis commands for a specific speed and $v_{DC}$ condition and torque command. The procedure is repeated at multiple torque commands and multiple speeds. Any known motor characterization procedure may be used. An example of IPM motor characterization is described in U.S. Pat. No. 8,744,794, the entire contents of which are incorporated herein by reference.

It should be understood that $i^*_d$ and $i^*_q$ are current commands for a stator of the motor 455.

In other example embodiments, the torque to current converter 430 may be implemented as a set of equations that relate respective torque commands to corresponding direct and quadrature axes currents, or a set of rules (e.g., if-then rules) that relates respective torque commands to corresponding direct and quadrature axes currents.

As shown in FIG. 4, the q-axis current command $i^*_q$ is output to the current regulator 435.

The current regulator 435 is capable of communicating with the pulse-width modulation (PWM) generation module 445 (e.g., space vector PWM generation module). The current regulator 435 receives respective d-q axis current commands (e.g., $i^*_d$ and $i^*_q$) and measured d-q axis stator currents (e.g., $i_{sq}$ and $i_{sd}$, where s refers to stator) and generates and outputs d-q axis voltage commands $v^*_d$ and $v^*_q$. It should be understood that the current regulator 435 may generate the d-q axis voltage commands (e.g., $v^*_d$ and $v^*_q$ commands) using any known method such as current feed forward compensation.

The converter 440 receives the d-q axis voltage commands $v^*_d$ and $v^*_q$ and performs an inverse Park transformation to generate α-β axis voltage commands $v^*_\alpha$ and $v^*_\beta$. While at least one example embodiment is described using the α-β axis, it should be understood that example embodiments may be implemented using the d-q axis or three phase representation of a control vector.

In an example embodiment, the PWM generation module 445 converts the α axis voltage and β axis voltage data (voltage commands $v^*_\alpha$ and $v^*_\beta$) from two phase data representations into three phase representations (e.g., three phase voltage representations, such as va*, vb* and vc*) for control of the motor 455, for example. Outputs of the PWM generation module 445 are coupled to the inverter circuit 450.

The inverter circuit 450 includes power electronics, such as switching semiconductors to generate, modify and control pulse-width modulated signals or other alternating current signals (e.g., pulse, square wave, sinusoidal, or other waveforms) applied to the motor 455. The PWM generation module 445 provides inputs to a driver stage within the inverter circuit 450. An output stage of the inverter circuit 450 provides a pulse-width modulated voltage waveform or other voltage signal for control of the motor 455. In an example embodiment, the inverter circuit 450 is powered by the direct current (dc) voltage bus voltage $V_{DC}$.

The current transducers 480a, 480b measure two of three phase current data ia and ib, respectively, applied to the motor 455. It should be understood that an additional current transducer may also measure a third phase current data ic.

The converter 460 may apply a Clarke transformation or other conversion equations (e.g., certain conversion equations that are suitable and are known to those of ordinary skill in the art) to convert the measured three-phase representations of current into two-phase representations of current based on the current data ia and ib from the current transducers 480a, 480b and the estimated rotor position $\widehat{\theta_r}$ from the position processor 470. The output of the converter 460 module ($i_{sq}$ and $i_{sd}$) is coupled to the current regulator 435.

As shown in FIG. 4, the position sensor 475 may be external to the motor controller 401.

More specifically, the position sensor 475 (e.g., a resolver, encoder, speed sensor, or another position sensor, speed sensors or algorithm) may determine the measured rotor position θr. The position sensor 475 may be mounted on or integral with the rotor of the motor 455. In an example embodiment, the position sensor 475 may be coupled to an analog-to-digital converter (not shown) that converts analog raw position data or velocity data to digital raw position or velocity data, respectively. In other example embodiments, the sensor 475 (e.g., digital position encoder) may provide a digital data output of raw position data or velocity data for a shaft or rotor of the motor 455.

In at least one example embodiment, the position sensor 475 is an incremental encoder with an index that produces A/B digital pulses. The A/B are digital pulses that provide direction and a number of pulses (like 512 pulses each) per rotor revolution. Once per mechanical revolution the index line (Z) pulses to provide an absolute position.

The position processor 470 receives the output from the position sensor 475 and generates the estimated rotor position $\widehat{\theta_r}$ and estimated/measured speed $\widehat{\omega_r}$. The position processor 470 accounts for sensing delays, converts the A/B/Z measurements to the corresponding position in radians or degrees or other engineering units.

A direction of rotation in the motor is determined by position processor 470 by order of rising edges in A and B.

For example, if the rising edge of A is followed by the rising edge of B, this corresponds to clockwise rotation. Similarly, the rising edge of B preceding the rising edge of A indicates a clockwise rotation.

In at least one example embodiment, the position processor 470 may determine the estimated/measured speed $\widehat{\omega_r}$ by determining an estimated position of the rotor $\widehat{\theta_r}$ as:

$$\widehat{\theta_r} = IndexAngle_Z + (CW_{EdgeCount} - CCW_{EdgeCount}) * \frac{2\pi \text{ rad}}{1024 \text{ edges}}$$

where $CW_{EdgeCount}$ is the edge count for the clockwise direction and $CCW_{EdgeCount}$ is the edge count for the counterclockwise direction and $IndexAngle_Z$ is the measurement of the index pulse Z.

The position processor 470 may determine the estimated/measured speed $\widehat{\omega_r}$ as:

$$\widehat{\omega_r} = \frac{\hat{\theta}_{r2} - \hat{\theta}_{r1}}{\Delta t}$$

where $\hat{\theta}_{r1}$ and $\hat{\theta}_{r2}$ are two position estimates taken sequentially ($\hat{\theta}_{r1}$ preceding $\hat{\theta}_{r2}$) with a change in time $\Delta t$ between estimates.

In some example embodiments, a sensorless position estimator 476 may be used instead of the position sensor 475. For example, the sensorless position estimator 476 may use outputs from at least two of the transducers 480*a*, 480*b*, and 480*c* to generate a position value. The position processor 470 uses the position value from the sensorless position estimator 476 to generate the estimated/measured speed $\widehat{\omega_r}$ and the estimated position of the rotor $\widehat{\theta_r}$. The sensorless position estimator 476 may be a type of observer, for example. However, example embodiments are not limited thereto.

In FIG. 5, a processing system includes an electronic data processor 564, a data bus 562, a data storage device 560, and one or more data ports (568, 570, 572, 574 and 576). The data processor 564, the data storage device 560 and one or more data ports are coupled to the data bus 562 to support communications of data between or among the data processor 564, the data storage device 560 and one or more data ports.

In an example embodiment, the data processor 564 may include an electronic data processor, a digital signal processor, microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 50 may include any magnetic, electronic, or optical device for storing data. For example, the data storage device 560 may include an electronic data storage device, an electronic memory, non-volatile electronic random access memory, one or more electronic data registers, data latches, a magnetic disc drive, a hard disc drive, an optical disc drive, or the like.

Moreover, in one example embodiment the data storage device 560 may store the controller 403, pulse width generation module 445, converter 460, and the position processor 470 to be used executed by the data processor 564. The data processor 564 may access the data storage device 560 and execute the controller 403, pulse width generation module 445, converter 460, and the position processor 470 via the data bus 562.

As shown in FIG. 5, the data ports include a first data port 568, a second data port 570, a third data port 572, a fourth data port 574 and a fifth data port 576, although any suitable number of data ports may be used. Each data port may include a transceiver and buffer memory, for example. In an example embodiment, each data port may include any serial or parallel input/output port.

In an example embodiment as illustrated in FIG. 5, the first data port 568 is coupled to the vehicle data bus 320. In turn, the vehicle data bus 320 is coupled to the RUC 305. In one configuration, the second data port 570 may be coupled to the inverter circuit 450; the third data port 572 may be coupled to the voltage sensor 485; the fourth data port 574 may be coupled to the transducers 480*a*, 480*b* and 480*c*; and the fifth data port 576 may be coupled to the position sensor 475.

Figure 6A:
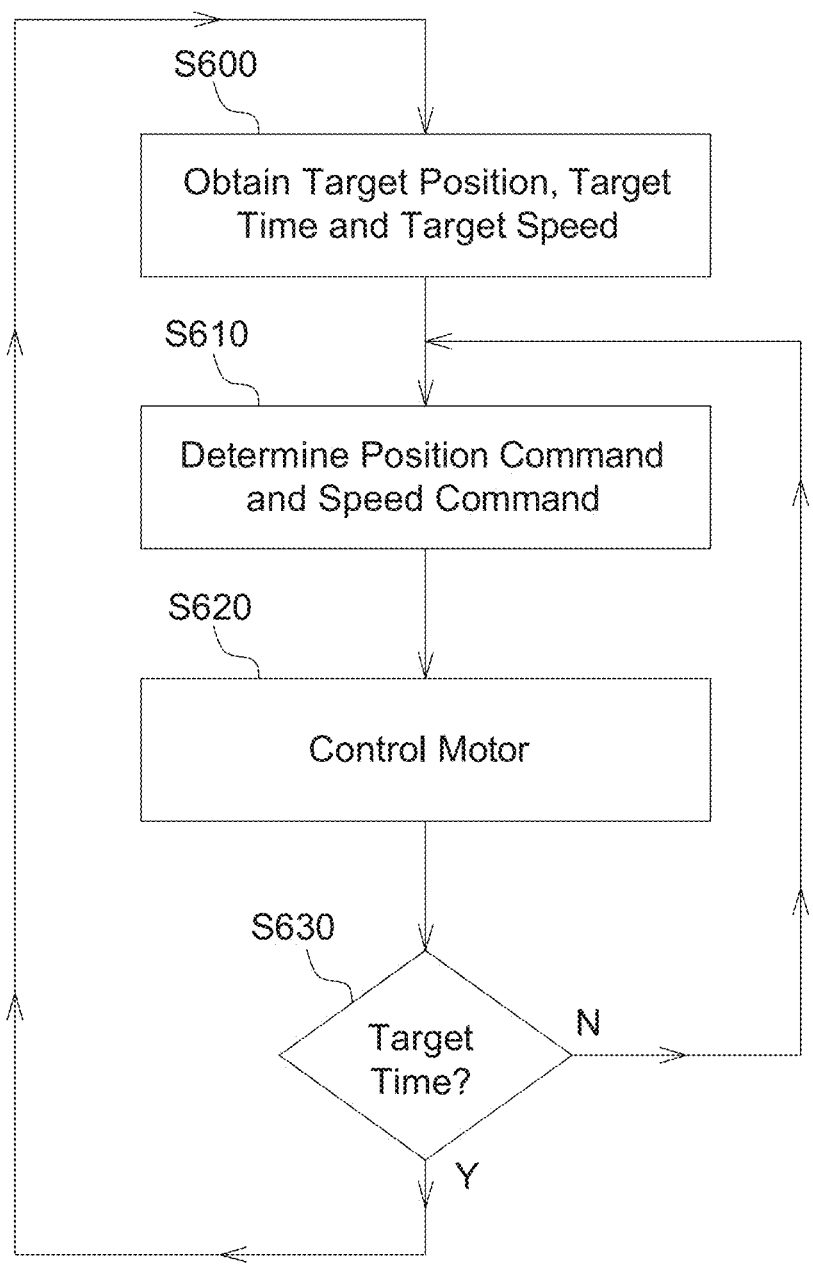
FIG. 6A illustrates a method of controlling an electric machine according to at least one example embodiment.

FIG. 6A illustrates a method of controlling a motor according to at least one example embodiment. A motor controller such as the motor controller 312 or the controller 316 may cause a system to perform the method of FIG. 6A.

At S600, the motor controller may obtain a target position, a target time and a target speed from a RUC controller. The target position, target time and target speed may be seed specific in that they are for a single seed. For example, the target position, target time and target speed may refer to desired delivery characteristics for the single seed.

Figure 8A:
FIG. 8A illustrates a controller area network (CAN) message according to at least one example embodiment.

The motor controller may receive at least one network message such as a CAN message from the RUC controller. The at least one network message may be a single CAN message or more than one CAN message. The at least one CAN message indicates the target position, the target time and the target speed. Example of CAN messages are illustrated in FIGS. 8A-8B. The target time indicates an expected time for a seed will depart from the brush and the target position is a target position of the rotor at the target time. The target speed may be a target speed of the motor at the target time (e.g., the time the seed leaves the brush). In some example embodiments, the target motor speed is selected to impart a zero net horizontal velocity of the seed relative to the ground.

The target position, target time and target speed are specific for each drive. For example, the target position for the brush is the target position of the motor when a next detected seed will leave the brush. Similarly, the target time is the anticipated time when the seed will leave the brush and the target speed is the target speed of the brush motor 80 when the next detected seed will leave the brush.

The RUC may send a target position, a target time and a target speed to the brush motor 80 and the meter drive motor 60. The target position, the target time and the target speed of a first motor (e.g., the brush motor) and the target position, the target time and the target speed of a second motor (e.g., the meter motor) may be different. For example, the target position of the brush motor may be different than the target position for the meter motor. In some example embodiments, the target position, the target speed and the target time for the meter motor track the target position, the target speed and the target time for the brush motor, respectively.

In some example embodiments, the RUC determines the target speed for the brush motor based on the ground speed. More specifically, the RUC determines the target speed for the brush motor such that the speed associated with the target position and the target speed the horizontal velocity of the seed relative to the ground is zero or approximately zero when the seed is dropped.

In some example embodiments, the RUC determines the target time based on an estimate of when the row unit will be at a position in the field when the next seed delivered to the ground. The determination of the target time may be based on target seed density (population), ground speed, last seed delivered, seed pattern, operator command, moisture conditions and contours of the path of the row unit, for example. In an example embodiment, the RUC may determine the target time by determining a distance to a next seed delivery and dividing the determined distance by the ground speed of the row unit.

In some example embodiments, the RUC may determine the target position based on a desired seed density.

At S610, the motor controller determines a position command and a speed command based on the target position, the target time and the target speed.

At S610, the motor controller selects a first mode of operation or a second mode of operation based on the target position, the target time and the target speed. The motor controller determines the position command and the speed command based on the selected mode of operation.

The motor controller may select the mode of operation in accordance with a task rate of the position regulator 425. The task rate may also be referred to as a step rate or an execution rate and is based on the clock rate of the motor controller. That is, the motor controller may select the mode of operation at every task determination.

When the motor controller selects the first mode of operation, the motor controller may use the position command and the speed command determined using the Gramian method. When the motor controller selects the second mode of operation, the motor controller may determine the position command and the speed command based on a bang bang method.

Figure 6B:
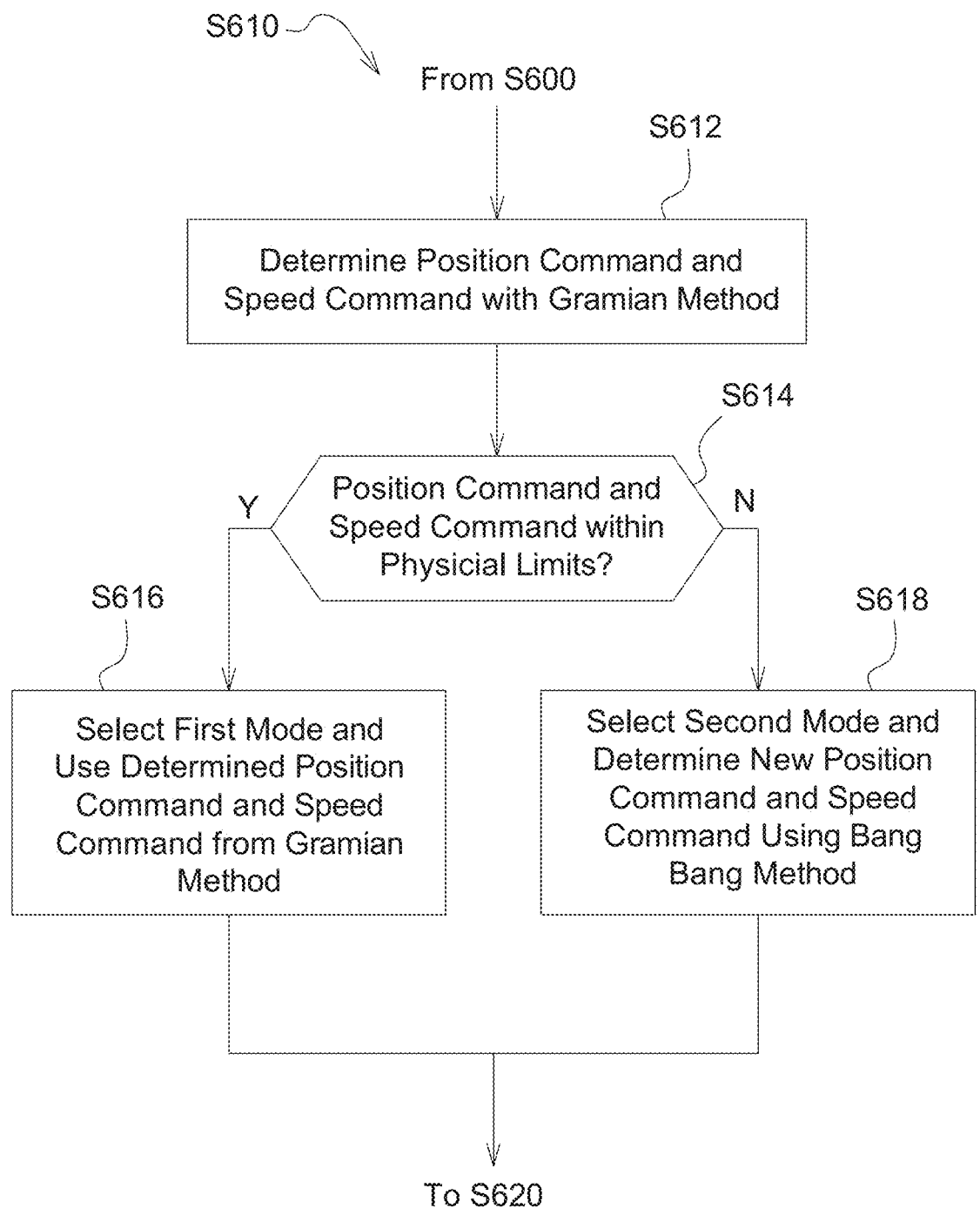
FIG. 6B illustrates a method of determining a position command and a speed command according to at least one example embodiment.

FIG. 6B illustrates an example embodiment of S610. In an example embodiment the motor controller determines the position command and the speed command using the Gramian method at S612. At S614, the motor controller determines if at least one of the determined position command and the determined speed command from S612 exceed a physical limit of the motor (e.g., exceeds an acceleration limit of the motor, a speed limit and/or a torque limit). If the determined position command and the determined speed command from S612 equal or do not exceed a physical limit of the motor, the motor controller selects the first mode of operation and uses the determined position command and the speed command from the Gramian method at S616. If at least one of the determined position command and the determined speed command from S612 exceed a physical limit of the motor, the motor controller selects the second mode of operation and uses the bang bang method at S618.

In other words, if the results of the Gramian method are position/speed profile (e.g., a position command and a speed command) that are within the physical limits of the motor, the motor controller uses the position command and the speed command determined by the motor controller using the Gramian method.

In a Gramian method, the motor controller may calculate a minimum control action $\int_{t_0}^{t^*_f} \|u(\tau)\| d\tau$ which passes through $x_f = (\theta^*_f, \omega^*_f)$ at time $t^*_f$.

The controller may determine the position command the speed command as $$\begin{bmatrix} \dot{\theta}^* \\ \dot{\omega}^* \end{bmatrix} = \begin{bmatrix} 0 & 1 \\ 0 & 0 \end{bmatrix}\begin{bmatrix} \theta^* \\ \omega^* \end{bmatrix} + \begin{bmatrix} 0 \\ 1 \end{bmatrix} u$$

$$A = \begin{bmatrix} 0 & 1 \\ 0 & 0 \end{bmatrix}, B = \begin{bmatrix} 0 \\ 1 \end{bmatrix}$$

$$u^*(t) = B^T e^{A^T(t-t_0)} W^{-1}(t_0, t^*_f)(x^*_f - e^{A(t-t_0)} x^*_0)$$

$$W(t_0, t^*_f) = \int_{t_0}^{t^*_f} e^{A(t^*_f - \tau)} BB^T e^{A^T(t^*_f - \tau)} d\tau$$

where a target $$x^*_f = \begin{bmatrix} \theta^*_f \\ \omega^*_f \end{bmatrix},$$

a command $$x^*_0 = \begin{bmatrix} \theta^*_0 \\ \omega^*_0 \end{bmatrix}$$

and is determined by the motor controller, W is a Gramian matrix, u* is the acceleration used to construct the desired position profile of the position command θ* over time, to is the time associated with the command $x_0$ (time at which a current position command θ*$_0$ and a current speed command ω*$_0$ are determined and used by the motor controller) at which the motor controller determines a new position command and a new speed command (the command x*$_0$ may then be updated to reflect the new position command and the new speed command). In an example embodiment, an initial value of x*$_0$ may be zero.

In some example embodiments, the time $t_0$ and the command $x_0$ may be updated at each iteration of the controller performing the calculation of $x_f$. By updating the time $t_0$ and the command $x_0$ at each iteration (step), an error is reduced since it does not accumulate. However, example embodiments are not limited thereto.

In the bang bang method, the motor controller may set a position command such that the motor accelerates and decelerates at maximum limits.

Figure 6C:
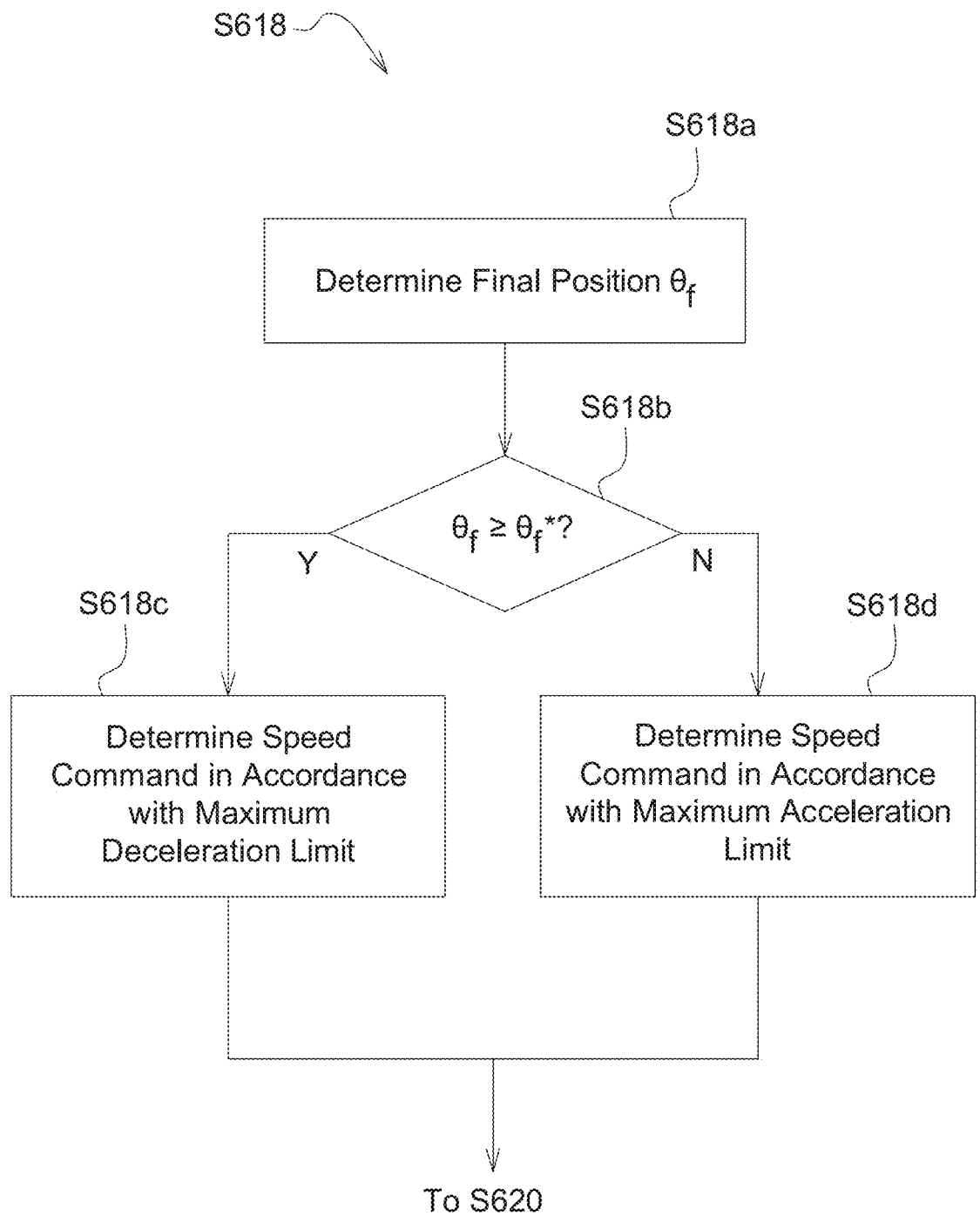
FIG. 6C illustrates a method of determining a position command and a speed command using a bang bang method according to at least one example embodiment.

FIG. 6C illustrates an example embodiment the bang bang method at S618. At each task step of using the bang bang method, the motor controller determines a final position θ$_f$ at the time $t_f$ assuming a maximum acceleration or maximum deceleration of the current speed command ω* to converge to the target final speed ω*$_f$ at S618a.

At S618b, the motor controller determines whether the determined final position θ$_f$ is greater than or equal to the target final position θ*$_f$.

If the motor controller determines the determined final position θ$_f$ is greater than or equal to the target final position θ*$_f$, the motor controller commands a maximum deceleration at S618c. If the motor controller determines the determined final position θ$_f$ is less than the target final position θ*$_f$, the motor controller commands a maximum acceleration at 618d.

Referring back to FIG. 6A, at S620, the motor controller controls the motor using the determined speed command and position command.

At S630, the motor controller determines whether a new message has been received. After the target final time has passed, the motor controller holds the most recent speed command so the motor does not stop after the target final time. If a new message from the RUC has not been received the motor controller proceeds to S610. If a new message from the RUC has been received, the motor controller proceeds to S600.

While FIG. 6A is described in relation to seed dispersion, it should be understood that example embodiments are not limited thereto. For example, the motor control described in FIG. 6 may be used in virtual gearboxes and virtual differentials (e.g., two tires have a same commanded angle at the same time, but are not physical coupled to do so).

Figure 7B:
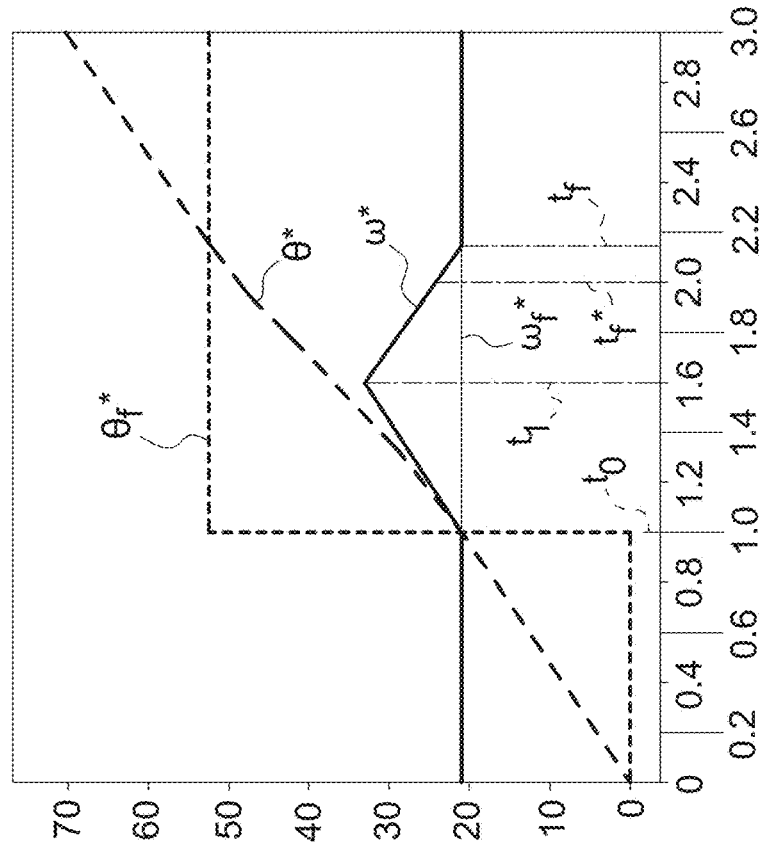
FIGS. 7A-7C illustrate timing diagrams of a speed command and a position command according to example embodiments.
Figure 7A:
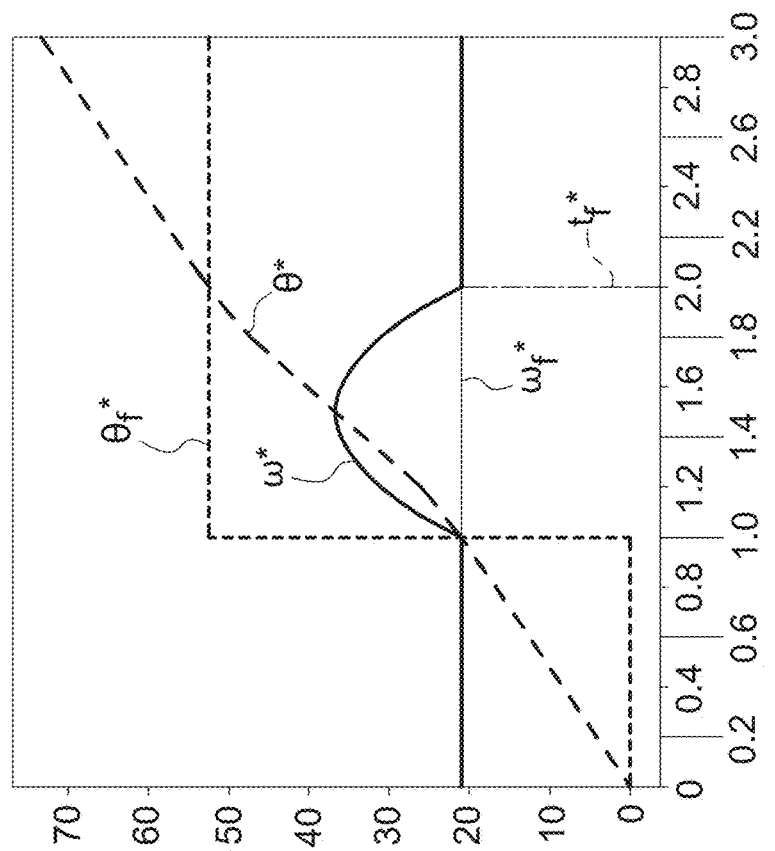
Figure 7C:
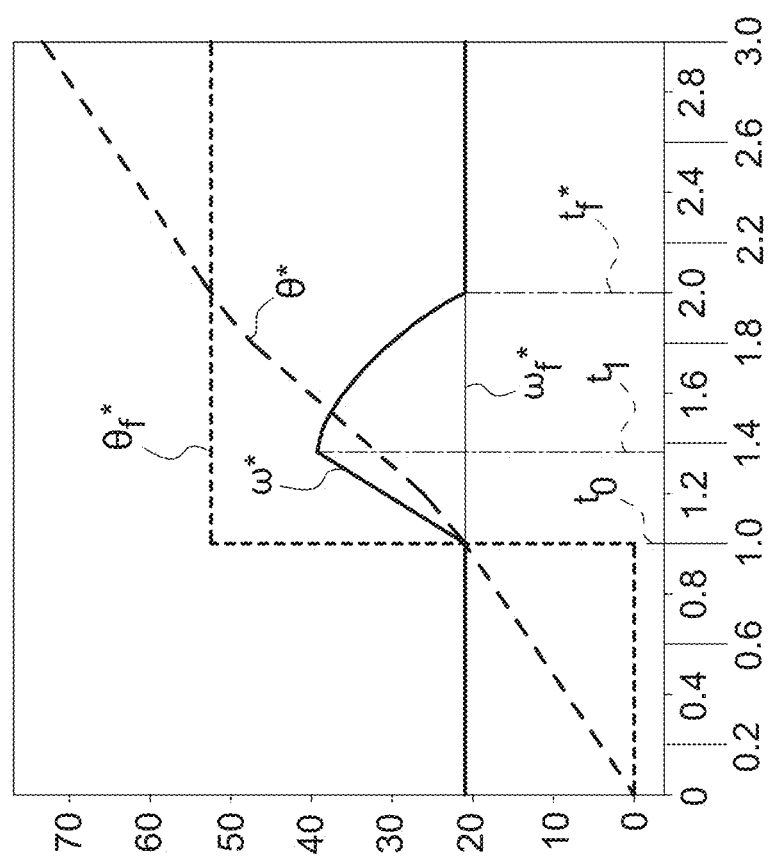

FIG. 7A illustrates a timing diagram of using the Gramian method, FIG. 7B illustrates a timing diagram of using the bang bang method and FIG. 7C illustrates a timing diagram of using the bang bang method and the Gramian method.

As shown in FIG. 7A, the motor controller receives at least one message from the RUC with a target speed $\omega^*_f$ of 21, a target position $\theta^*_f$ of 52 radians and a target time $t^*_f$ of 2 s. Upon receipt of the at least one message, the motor controller determines the speed command $\omega^*$ and the position command $\theta^*$. At every task step, the motor controller determines the speed command $\omega^*$ and the position command $\theta^*$. In FIG. 7A, every determination of the speed command $\omega^*$ and the position command $\theta^*$ is within the physical limits of the motor. Thus, the motor controller uses the Gramian method.

As shown in FIG. 7B, the motor controller receives at least one message from the RUC with a target speed $\omega^*_f$ of 21 radians/s, a target position $\theta^*_f$ of 52 radians and a target time $t^*_f$ of 2 s. Upon receipt of the at least one message, the motor controller determines the speed command $\omega^*$ and the position command $\theta^*$. At every task step, the motor controller determines the speed command $\omega^*$ and the position command $\theta^*$. In FIG. 7B, every determination of the speed/position profile (i.e., speed command $\omega^*$ and the position command $\theta^*$) using the Gramian method is not within the physical limits of the motor. Thus, the motor controller uses the bang bang method from receiving the at least one message to the target time. The motor controller uses a maximum acceleration from $t_0$ to $t_1$ and a maximum deceleration from $t_1$ to $t_f$. In the example shown in FIG. 7B, the seed is dropped at $t_f$, which is after $t^*_f$.

As shown in FIG. 7C, the motor controller receives a at least one message from the RUC with a target speed $\omega^*_f$ of 21 radians/s, a target position $\theta^*_f$ of 52 radians and a target time $t^*_f$ of 2 s. Upon receipt of the at least one message, the motor controller determines the speed command $\omega^*$ and the position command $\theta^*$. At every task step, the motor controller determines the speed command $\omega^*$ and the position command $\theta^*$. In FIG. 7C, every determination of the speed/position profile (i.e., speed command $\omega^*$ and the position command $\theta^*$) using the Gramian method until time $t_1$ is not within the physical limits of the motor. Thus, the motor controller uses the bang bang method from receiving the at least one message $t_0$ to the time $t_1$. At time t1, the Gramian method is within the physical limits of the motor and the controller uses Gramian method to command the motor. The motor controller uses the Gramian method from $t_1$ to $t_f$. In the example shown in FIG. 7C, the seed is dropped at $t_f$, which is after the target time $t^*_f$ (time where speed command $\omega^*$ and the position command $\theta^*$ equal the target speed and the target position, respectively).

FIG. 8A illustrates a CAN message 800 for sending the target speed $\omega^*_f$, a target position $\theta^*_f$ and a target time $t^*_f$ to a motor controller according to at least one example embodiment.

In an example embodiment, the message format is in accordance with International Electrotechnical Commission (IEC) 61800. As shown in FIG. 8, the target time $t^*_f$ may be signaled in sub-index 1 of an object ID (e.g., 0x3823), the target speed $\omega^*_f$ may be signaled in sub-index 2 of the object and the target position $\theta^*_f$ may be signaled in sub-index 3 of the object.

A position command input mode may be signaled in sub-index 4 of the object. If the value of the position command input mode is 0, the motor controller recognizes that the message includes no final time or final position. If the value of the position command input mode is 1, the motor controller recognizes the target position in sub-index 3 as the target position $\theta^*_f$. If the value of the position command input mode is 1, the motor controller recognizes the target position in sub-index 3 as the target position $\theta^*_f$. If the value of the position command input mode is 2, the motor controller recognizes subindex 1 is a delta time command (dt*) instead of the target time $t^*_f$ and subindex 3 is an increment position command instead of the target position $\theta^*_f$. The delta time command dt* can be $t^*_f$ − t_canRX, where t_canRX is the time in which the CAN message 800 is received by the controller of the motor. The increment position command can be $\theta^*_f$−Pos*_canRX−$\omega^*_f$*(t_canRX+dt*) where Pos*_canRX is a commanded value in the position reference calculation algorithm at the time that the delta time command message (e.g., in 0x3823_1) is received.

FIG. 8B illustrates a data field for a CAN message for sending a target position $\theta^*_f$ and a target time $t^*_f$ according to at least one example embodiment. A data field 850 may be implemented in an 11-bit CAN ID message frame. However, example embodiments are not limited thereto. In some example embodiments, the target speed $\omega^*_f$ may be sent in a separate CAN message.

As shown in FIG. 8B, a first four bytes of data may be allocated for the target position $\theta^*_f$ and the second four bytes may be allocated for the target position $\theta^*_f$. The target position $\theta^*_f$ may be in a 1 µs resolution and the target position $\theta^*_f$ may be in 0.1 degree resolution.

The CAN message of FIG. 8B, may further include an start-of-frame (SOF) field 855, a CAN ID field 860, a remote transmission request (RTR) field 865, a control field 870, a cyclic redundancy check (CRC) field 875, an acknowledgement (ACK) field 880 and an end of frame field 885 arranged in that order with the data field 850 being between the control field 870 and the CRC field 875.

FIG. 8C illustrates a CAN message for sending the a target position $\theta^*_f$ and a target time $t^*_f$ according to at least one example embodiment. A data field 935 may be implemented in an SAE J1939 CAN frame. However, example embodiments are not limited thereto. In some example embodiments, the target speed $\omega^*_f$ may be sent in a separate CAN message.

As shown in FIG. 8C, a first four bytes of data 935a may be allocated for the target position $\theta^*_f$ and the second four bytes 935b may be allocated for the target position $\theta^*_f$. The target position $\theta^*_f$ may be in a 1 µs resolution and the target position $\theta^*_f$ may be in 0.1 degree resolution.

The CAN message of FIG. 8C, may further include an start-of-frame (SOF) field 900, an 11 bit CAN ID field 860, substitute request bit (SRR) 910, an identifier extension bit (IDE) 915, an 18 bit CAN ID 920, a remote transmission request (RTR) field 925, a control field 930, a cyclic redundancy check (CRC) field 940, an acknowledgement (ACK)

field 945 and an end of frame field 950 arranged in that order with the data field 935 being between the control field 930 and the CRC field 940.

At least one example embodiment provides a non-transitory computer-readable medium storing instructions, when executed by at least one controller, is configured to cause the system to obtain at least one message over a network, the at least one message indicating a target position for a rotor of a motor and a target time associated with target position, determine a position command and a speed command based on the target position and the target time, and control the motor based on the position command and the speed command.

In at least one example embodiment, the non-transitory computer-readable medium stores the instructions, when executed by the at least one controller, are configured to cause the system to obtain a target speed in the at least one message, the target speed associated with the target time and the target position and determine the position command and the speed command based on the target position, the target time and the target speed.

In at least one example embodiment, the target speed is based on a speed of a planter row unit.

In at least one example embodiment, the target position is associated with a seed being ejected and is an expected position of the rotor of the motor at which the seed is ejected.

In at least one example embodiment, the non-transitory computer-readable medium stores the instructions, when executed by the at least one controller, are configured to cause the system to select a first mode of operation or a second mode of operation based on the target position and the target time and determine the position command and the speed command based on the selected mode.

In at least one example embodiment, the non-transitory computer-readable medium stores the instructions, when executed by the at least one controller, are configured to cause the system to select the first mode of operation or the second mode of operation at each cycle.

In at least one example embodiment, the non-transitory computer-readable medium stores the instructions, when executed by the at least one controller, are configured to cause the system to determine the position command and the speed command based on a Gramian method in the first mode of operation.

In at least one example embodiment, the non-transitory computer-readable medium stores the instructions, when executed by the at least one controller, are configured to cause the system to determine the position command and the speed command as:

$$\begin{bmatrix} \dot{\theta}^* \\ \dot{\omega}^* \end{bmatrix} = \begin{bmatrix} 0 & 1 \\ 0 & 0 \end{bmatrix} \begin{bmatrix} \theta^* \\ \omega^* \end{bmatrix} + \begin{bmatrix} 0 \\ 1 \end{bmatrix} u$$

$$A = \begin{bmatrix} 0 & 1 \\ 0 & 0 \end{bmatrix}, B = \begin{bmatrix} 0 \\ 1 \end{bmatrix}$$

$$u^*(t) = B^T e^{A^T(t-t_0)} W^{-1}(t_0, t_f^*)(x_f^* - e^{A(t-t_0)} x_0^*)$$

$$W(t_0, t_f^*) = \int_{t_0}^{t_f^*} e^{A(t_f^* - \tau)} BB^T e^{A^T(t_f^* - \tau)} d\tau$$

where a target $$x_f^* = \begin{bmatrix} \theta_f^* \\ \omega_f^* \end{bmatrix},$$

a command $$x_0^* = \begin{bmatrix} \theta_0^* \\ \omega_0^* \end{bmatrix},$$

$\theta^*_0$ is an instance of the position command, $\omega^*_0$ is an instance of the speed command, $\theta^*$ is the position command, $\omega^*$ is the speed command, W is a Gramian matrix, u* is an acceleration to construct the position command over time, and $t_0$ is the time associated with the command $x_0$ at which the system performs the determination of the position command.

In at least one example embodiment, the non-transitory computer-readable medium stores the instructions, when executed by the at least one controller, are configured to cause the system to determine the position command and the speed command based on a bang-bang method in the second mode of operation.

In at least one example embodiment, network is a controller area network (CAN).

At least one example embodiment provides a system including a motor, means for obtaining at least one message over a network, the at least one message indicating a target position for a rotor of the motor and a target time associated with target position, means for determining a position command and a speed command based on the target position and the target time and means for controlling the motor based on the position command and the speed command.

In at least one example embodiment, the means for obtaining is configured to obtain a target speed in the at least one message, the target speed associated with the target time and the target position and the means for determining is configured to the position command and the speed command based on the target position, the target time and the target speed.

In at least one example embodiment, the target speed is based on a speed a planter row unit.

In at least one example embodiment, the target position is associated with a seed being ejected and is an expected position of the rotor of the motor at which the seed is ejected.

In at least one example embodiment, the system further includes a means for selecting a first mode of operation or a second mode of operation based on the target position and the target time, and the means for determining is configured to determine the position command and the speed command based on the selected mode.

In at least one example embodiment, the means for selecting is configured to select the first mode of operation or the second mode of operation at each cycle.

In at least one example embodiment, the means for determining is configured to determine the position command and the speed command based on a Gramian method in the first mode of operation.

In at least one example embodiment, the means for determining is configured to determine the position command and the speed command as:

$$\begin{bmatrix} \dot{\theta}^* \\ \dot{\omega}^* \end{bmatrix} = \begin{bmatrix} 0 & 1 \\ 0 & 0 \end{bmatrix} \begin{bmatrix} \theta^* \\ \omega^* \end{bmatrix} + \begin{bmatrix} 0 \\ 1 \end{bmatrix} u$$

$$A = \begin{bmatrix} 0 & 1 \\ 0 & 0 \end{bmatrix}, B = \begin{bmatrix} 0 \\ 1 \end{bmatrix}$$

-continued
$$u^*(t) = B^T e^{A^T(t-t_0)} W^{-1}(t_0, t_f^*)(x_f^* - e^{A(t-t_0)} x_0^*)$$

$$W(t_0, t_f^*) = \int_{t_0}^{t_f^*} e^{A(t_f^*-\tau)} BB^T e^{A^T(t_f^*-\tau)} d\tau$$

where a target $$x_f^* = \begin{bmatrix} \theta_f^* \\ \omega_f^* \end{bmatrix},$$

a command $$x_0^* = \begin{bmatrix} \theta_0^* \\ \omega_0^* \end{bmatrix},$$

$\theta^*_0$ is an instance of the position command, $\omega^*_0$ is an instance of the speed command, $\theta^*$ is the position command, $\omega^*$ is the speed command, W is a Gramian matrix, u* is an acceleration to construct the position command over time, and t0 is the time associated with the command $x_0$ at which the system performs the determination of the position command.

In at least one example embodiment, the means for determining is configured to determine the position command and the speed command based on a bang-bang method in the second mode of operation.

In at least one example embodiment, the network is a controller area network (CAN) and the at least one controller is configured to obtain the at least one message over a CAN bus.

In at least one example embodiment, the system further includes a seed deliverer coupled to the motor.

In at least one example embodiment, the seed deliverer is a brush.

In at least one example embodiment, the system further includes a seed meter coupled to the motor.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A system comprising:
 a motor;
 a memory storing instructions; and
 at least one controller configured to execute the instructions to cause the system to,
  obtain at least one message over a network, the at least one message indicating a target position for a rotor of the motor and a target time associated with target position,
  select a first mode of operation or a second mode of operation based on the target position and the target time,
  determine a position command and a speed command based on the target position and the target time and based on the selected first mode of operation or the second mode of operation, and
  control the motor based on the position command and the speed command.

2. The system of claim 1, wherein the at least one controller is further configured to execute the instructions to cause the system to,
 obtain a target speed in the at least one message, the target speed associated with the target time and the target position, and
 determine the position command and the speed command based on the target position, the target time and the target speed.

3. The system of claim 2, wherein the target speed is based on a speed of a planter row unit.

4. The system of claim 3, wherein the target position is associated with a seed being ejected and is an expected position of the rotor of the motor at which the seed is ejected.

5. The system of claim 1, wherein the at least one controller is further configured to execute the instructions to cause the system to,
 select the first mode of operation or the second mode of operation at each cycle.

6. The system of claim 1, wherein the at least one controller is further configured to execute the instructions to cause the system to,
 determine the position command and the speed command based on a Gramian method in the first mode of operation.

7. The system of claim 6, wherein the at least one controller is further configured to execute the instructions to cause the system,
 determine the position command and the speed command as:

$$\begin{bmatrix} \dot{\theta}^* \\ \dot{\omega}^* \end{bmatrix} = \begin{bmatrix} 0 & 1 \\ 0 & 0 \end{bmatrix} \begin{bmatrix} \theta^* \\ \omega^* \end{bmatrix} + \begin{bmatrix} 0 \\ 1 \end{bmatrix} u$$

$$A = \begin{bmatrix} 0 & 1 \\ 0 & 0 \end{bmatrix}, B = \begin{bmatrix} 0 \\ 1 \end{bmatrix}$$

$$u^*(t) = B^T e^{A^T(t-t_0)} W^{-1}(t_0, t_f^*)(x_f^* - e^{A(t-t_0)} x_0^*)$$

$$W(t_0, t_f^*) = \int_{t_0}^{t_f^*} e^{A(t_f^*-\tau)} BB^T e^{A^T(t_f^*-\tau)} d\tau$$

where a target $$x_f^* = \begin{bmatrix} \theta_f^* \\ \omega_f^* \end{bmatrix},$$

a command $$x_0^* = \begin{bmatrix} \theta_0^* \\ \omega_0^* \end{bmatrix},$$

$\theta^*_0$ is an instance of the position command, $\omega^*_0$ is an instance of the speed command, $\theta^*$ is the position command, $\omega^*$ is the speed command, W is a Gramian matrix, u* is an acceleration to construct the position command over time, and $t_0$ is the time associated with the command $x_0$ at which the controller performs the determination of the position command.

8. The system of claim 1, wherein the at least one controller is further configured to execute the instructions to cause the system to, determine the position command and the speed command based on a bang-bang method in the second mode of operation.

9. The system of claim 1, wherein the network is a controller area network (CAN) and the at least one controller is configured to obtain the at least one message over a CAN bus.

10. The system of claim 1, further comprising:
a seed deliverer coupled to the motor.

11. The system of claim 10, wherein the seed deliverer is a brush.

12. The system of claim 1, further comprising:
a seed meter coupled to the motor.

13. The system of claim 1, wherein the at least one controller is further configured to determine the position command and the speed command based on a Gramian method in the first mode of operation or a bang-bang method in the second mode of operation.

14. The system of claim 1, wherein the at least one controller is further configured to execute the instructions to cause the system to,
in the first mode of operation, select the second mode of operation based on the determined position command and the determined speed command exceeding a physical limit of the motor.

15. A non-transitory computer-readable medium storing instructions, when executed by at least one controller in a system, configured to cause the system to:
obtain at least one message over a network, the at least one message indicating a target position for a rotor of a motor and a target time associated with target position,
select a first mode of operation or a second mode of operation based on the target position and the target time,
determine a position command and a speed command based on the target position and the target time and based on the selected first mode of operation or the second mode of operation, and
control the motor based on the position command and the speed command.

16. The non-transitory computer-readable medium of claim 15, wherein the non-transitory computer-readable medium stores the instructions, when executed by the at least one controller, are configured to cause the system to,
obtain a target speed in the at least one message, the target speed associated with the target time and the target position, and
determine the position command and the speed command based on the target position, the target time and the target speed.

17. The non-transitory computer-readable medium of claim 15, wherein the target speed is based on a speed of a planter row unit.

18. The non-transitory computer-readable medium of claim 17, wherein the target position is associated with a seed being ejected and is an expected position of the rotor of the motor at which the seed is ejected.

19. The non-transitory computer-readable medium of claim 15, wherein the non-transitory computer-readable medium stores the instructions, when executed by the at least one controller, are configured to cause the system to,
select the first mode of operation or the second mode of operation at each cycle.

20. The non-transitory computer-readable medium of claim 15, wherein the non-transitory computer-readable medium stores the instructions, when executed by the at least one controller, are configured to cause the system to,
determine the position command and the speed command based on a Gramian method in the first mode of operation.

21. The non-transitory computer-readable medium of claim 15, wherein the non-transitory computer-readable medium stores the instructions, when executed by the at least one controller, are configured to cause the system to,
determine the position command and the speed command as:

$$\begin{bmatrix} \dot{\theta}^* \\ \dot{\omega}^* \end{bmatrix} = \begin{bmatrix} 0 & 1 \\ 0 & 0 \end{bmatrix} \begin{bmatrix} \theta^* \\ \omega^* \end{bmatrix} + \begin{bmatrix} 0 \\ 1 \end{bmatrix} u$$

$$A = \begin{bmatrix} 0 & 1 \\ 0 & 0 \end{bmatrix}, B = \begin{bmatrix} 0 \\ 1 \end{bmatrix}$$

$$u^*(t) = B^T e^{A^T(t-t_0)} W^{-1}(t_0, t_f^*)(x_f^* - e^{A(t-t_0)} x_0^*)$$

$$W(t_0, t_f^*) = \int_{t_0}^{t_f^*} e^{A(t_f^* - \tau)} B B^T e^{A^T(t_f^* - \tau)} d\tau$$

where a target $$x_f^* = \begin{bmatrix} \theta_f^* \\ \omega_f^* \end{bmatrix},$$

a command $$x_0^* = \begin{bmatrix} \theta_0^* \\ \omega_0^* \end{bmatrix},$$

$\theta^*_0$ is an instance of the position command, $\omega^*_0$ is an instance of the speed command, $\theta^*$ is the position command, $\omega^*$ is the speed command, W is a Gramian matrix, u* is an acceleration to construct the position command over time, and $t_0$ is the time associated with the command $x_0$ at which the system performs the determination of the position command.

22. The non-transitory computer-readable medium of claim 15, wherein the non-transitory computer-readable medium stores the instructions, when executed by the at least one controller, are configured to cause the system to,
determine the position command and the speed command based on a bang-bang method in the second mode of operation.

23. The non-transitory computer-readable medium of claim 15, wherein the network is a controller area network (CAN).

* * * * *